United States Patent
Wang et al.

(10) Patent No.: US 11,972,096 B2
(45) Date of Patent: Apr. 30, 2024

(54) PICTURE SELECTION METHOD AND ELECTRONIC DEVICE

(71) Applicant: Huawei Technologies Co., Ltd., Shenzhen (CN)

(72) Inventors: Manshu Wang, Shenzhen (CN); Yongming Zhang, Beijing (CN); Ziran Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/774,119

(22) PCT Filed: Nov. 4, 2020

(86) PCT No.: PCT/CN2020/126524
§ 371 (c)(1),
(2) Date: May 3, 2022

(87) PCT Pub. No.: WO2021/088881
PCT Pub. Date: May 14, 2021

(65) Prior Publication Data
US 2022/0391071 A1    Dec. 8, 2022

(30) Foreign Application Priority Data
Nov. 4, 2019    (CN) .......................... 201911067532.6

(51) Int. Cl.
*G06F 3/0482* (2013.01)
*G06F 3/04842* (2022.01)
*G06F 16/583* (2019.01)

(52) U.S. Cl.
CPC ........ *G06F 3/04842* (2013.01); *G06F 3/0482* (2013.01); *G06F 16/583* (2019.01)

(58) Field of Classification Search
CPC ... G06F 3/04842; G06F 16/583; G06F 3/0482
See application file for complete search history.

(56) References Cited

U.S. PATENT DOCUMENTS 10,402,825 B2 * 9/2019 Song ...................... G06Q 50/12
11,430,051 B1 * 8/2022 Schweinfurth .... G06Q 30/0603
(Continued)

FOREIGN PATENT DOCUMENTS

| CN | 103530114 A | 1/2014 |
| CN | 104820675 A | 8/2015 |

(Continued)

OTHER PUBLICATIONS

"Series H: Audiovisual and Multimedia Systems, Infrastructure of audiovisual services—Coding of moving video, Advanced video coding for generic audiovisual services," ITU-T H.264, Total 836 pages, International Union of Telecommunication, Geneva, Switzerland (Jun. 2019).

*Primary Examiner* — Anil K Bhargava
(74) *Attorney, Agent, or Firm* — Leydig, Voit & Mayer, Ltd.

(57) ABSTRACT

A picture selection method and an electronic device are provided. The method includes: displaying a first interface in an interaction scenario of a first application, where the first interface includes a picture selection button; and displaying a target album interface in response to a first operation performed by a user to trigger the picture selection button, where the target album interface includes thumbnails of at least two pictures that carry different identifier information or at least two picture sets that carry different identifier information; and where identifier information is generated based on interaction scenarios of at least two applications, and the identifier information includes at least one of an application name of an application, time of an interaction scenario of an application, or a quantity of times in an interaction scenario of an application.

18 Claims, 32 Drawing Sheets

(56) References Cited

U.S. PATENT DOCUMENTS

| | | | |
|---|---|---|---|
| 11,687,876 B2* | 6/2023 | Grande | G06Q 30/0631 |
| | | | 705/28 |
| 2010/0016003 A1* | 1/2010 | Shapiro | H04L 43/0811 |
| | | | 715/810 |
| 2013/0159456 A1* | 6/2013 | Daoud | G16H 20/17 |
| | | | 709/217 |
| 2016/0104253 A1* | 4/2016 | Song | H04W 4/02 |
| | | | 705/15 |
| 2017/0038922 A1* | 2/2017 | Eim | H04W 4/50 |
| 2022/0342519 A1* | 10/2022 | Missig | G06F 3/0482 |
| 2023/0080966 A1* | 3/2023 | Shoen | G06T 1/0007 |
| 2023/0106434 A1* | 4/2023 | Han | G06T 7/62 |
| | | | 345/156 |

FOREIGN PATENT DOCUMENTS

| | | | |
|---|---|---|---|
| CN | 104820683 | A | 8/2015 |
| CN | 104834687 | A | 8/2015 |
| CN | 303466644 | S | 11/2015 |
| CN | 303805736 | S | 8/2016 |
| CN | 107133352 | A | 9/2017 |
| CN | 109145142 | A | 1/2019 |
| CN | 110377772 | A | 10/2019 |
| JP | 2000069421 | A | 3/2000 |

\* cited by examiner

PICTURE SELECTION METHOD AND ELECTRONIC DEVICE

CROSS-REFERENCE TO RELATED APPLICATIONS

This application is a national stage of International Application No. PCT/CN2020/126524, filed on Nov. 4, 2020, which claims priority to Chinese Patent Application No. 201911067532.6, filed on Nov. 4, 2019. Both of the aforementioned applications are hereby incorporated by reference in their entireties.

TECHNICAL FIELD

This application relates to the terminal field, and in particular, to a picture selection method and an electronic device.

BACKGROUND

Currently, many applications (apps) can upload or edit a picture. For example, some apps (for example, a wealth management app and a bank app) require a user to upload a picture of a front/back side of an identity card for review, to ensure that a current service target is the user; some apps (for example, a cloud disk app) may store a picture uploaded by a user in a cloud, to save device memory; some apps (for example, a chat app) may publish a photo uploaded by a user (for example, publish the photo in Moments), to meet a social requirement of the user; and some apps (for example, a picture retouching app) can edit (for example, beautify or crop) a photo in a gallery.

When selecting a to-be-uploaded or to-be-edited picture in a corresponding app, a user may search a system album for the picture. However, the system album may store thousands or even tens of thousands of pictures. It is time-consuming for the user to search for the required picture from so many pictures.

SUMMARY

Embodiments of this application provide a picture selection method and an electronic device, to reduce time for a user to select a picture in an application, and improve user experience.

According to a first aspect, an embodiment of this application provides a picture selection method, applied to an electronic device and including: displaying a first interface in an interaction scenario of a first application, where the first interface includes a picture selection button; and displaying a target album interface in response to a first operation performed by a user to trigger the picture selection button, where the target album interface includes: thumbnails of at least two pictures that carry different identifier information; or at least two picture sets that carry different identifier information; and the identifier information is generated based on interaction scenarios of at least two applications, and the identifier information includes at least one of an application name of an application, time of an interaction scenario, or a quantity of times in an interaction scenario.

According to the method provided in this embodiment of this application, in the interaction scenario of the first application, when the user selects a picture in the target album interface, because the target album interface includes the thumbnails of the at least two pictures that carry different identifier information, or the at least two picture sets that carry different identifier information, and the identifier information is generated based on the interaction scenarios of the at least two applications, the user can select the picture across applications, and does not need to select the picture from massive pictures in a system album, so that the user can select the picture more quickly and pertinently, thereby reducing time for the user to select the picture and improving user experience.

In a possible implementation, the interaction scenario includes a scenario of picture uploading, picture editing, or picture downloading. The picture editing scenario may include a picture beautification scenario, for example, scenarios such as adding a filter, making up, or cropping.

In a possible implementation, the identifier information further includes at least one of a content category of a picture, a geographical location of a picture, a source of a picture, usage of a picture, favorites information of a picture, or preference information of a picture.

In this way, the user can select the picture from the target album more intuitively and pertinently based on the content category of the picture, the geographical location of the picture, the source of the picture, the usage of the picture, the favorite information of the picture, or the preference information of the picture, thereby reducing time for the user to select the picture and improving user experience.

In a possible implementation, in the target album interface, a picture or a picture set with identifier information including an application name of the first application is located before a picture or a picture set with identifier information including an application name of another application.

It may be understood that, when selecting the picture in the first application, the user would be more likely to search for a picture processed by the first application. Therefore, an application name of the first application is displayed in a first place, so that the user preferably searches for the to-be-uploaded picture in the picture processed by the first application, thereby improving user experience.

In a possible implementation, the displaying a target album interface in response to a first operation performed by a user to trigger the picture selection button includes: popping up a dialog box in the first interface in response to the first operation performed by the user to trigger the picture selection button, where the dialog box includes a target album button; and displaying the target album interface in response to a second operation performed by the user to select the target album button.

In a possible implementation, the method further includes: displaying, in response to a third operation in which the user selects at least one picture in the target album interface, at least one of time of the at least one selected picture, a geographical location of the at least one selected picture, and a picture associated with the at least one picture. In this way, the user can clearly know the time and the geographical location of the at least one selected picture. Alternatively, the user can quickly find the required picture from the associated picture, thereby reducing time for the user to select the picture.

In a possible implementation, the method further includes: uploading the at least one picture; and if the picture is successfully uploaded, displaying, by the electronic device, a first prompt that the picture is successfully uploaded; or if the picture fails to be uploaded, displaying, by the electronic device, a second prompt that the picture fails to be uploaded, where the second prompt includes one or more of the following: a picture format is not supported, a picture size exceeds a first threshold, or a quantity of to-be-uploaded pictures exceeds a second threshold. In this way, the user can learn of, based on the prompt information, a reason why the picture fails to be uploaded, thereby pertinently resolving a problem that the picture fails to be uploaded.

In a possible implementation, after the picture is successfully uploaded, the method further includes: updating identifier information of the successfully uploaded picture, and prompting the user with updated identifier information by using the first prompt. In this way, the user can learn of a usage status of the picture based on the updated identifier information of the picture, so that rich reference information about the picture is provided for the user, which helps the user select the required picture more conveniently in the future.

In a possible implementation, the method further includes: redetermining a display manner of the thumbnails of the at least two pictures or the at least two picture sets in the target album interface based on the updated identifier information. In this way, the user may learn of a recent usage status of the picture based on the re-determined display manner, which helps the user select the required picture more conveniently.

In a possible design, the at least two applications belong to a same application type. In this way, when selecting the picture in the interaction scenario of the first application, the user can select the picture from a picture corresponding to an application of a same type as the first application. Because interaction scenarios of applications of a same type are more similar, the user is more likely to select the required picture from the picture corresponding to the application of the same type, thereby improving user experience. Alternatively, the at least two applications belong to a group of applications that are jointly developed, jointly registered, jointly packaged, jointly deployed, or mutually bound. Therefore, interaction scenarios of such a group of applications are usually associated (for example, a group of jointly developed applications usually require, when verifying user identity information, the user to enter same or similar information). In this way, the user is more likely to select the required picture from pictures corresponding to such the group of applications, thereby improving user experience. Alternatively, the at least two applications execute preset logic processing within a preset time period. In this way, the user can select the picture from a picture that has been uploaded, edited, or downloaded within the more appropriate time period, which helps the user select the required picture more conveniently and quickly, thereby improving user experience.

In a possible implementation, the displaying a target album interface includes: controlling an activity corresponding to the first interface to start an intent, and transferring a uniform resource identifier (URI) of a target album in the intent; gaining access to a multimedia database based on the URI of the target album, where the multimedia database stores paths of at least two pictures that carry different identifier information or a path of each picture in at least two picture sets that carry different identifier information; obtaining, based on the paths of the at least two pictures that carry different identifier information, the at least two pictures that carry different identifier information, or obtaining, based on the path of each picture in the at least two picture sets that carry different identifier information, each picture in the at least two picture sets that carry different identifier information; and performing zooming processing on and displaying the at least two pictures that carry different identifier information, or performing zooming processing on and displaying cover pictures of the at least two picture sets that carry different identifier information.

In a possible implementation, the method further includes: in an interaction scenario of each of the at least two applications, writing, into the multimedia database, a path of a picture on which logic processing such as picture uploading, picture editing, or picture downloading is performed.

According to a second aspect, an embodiment of this application provides an electronic device including a display unit, configured to: display a first interface in an interaction scenario of a first application, where the first interface includes a picture selection button. The display unit is further configured to display a target album interface in response to a first operation performed by a user to trigger the picture selection button, where the target album interface includes: thumbnails of at least two pictures that carry different identifier information; or at least two picture sets that carry different identifier information; and the identifier information is generated based on interaction scenarios of at least two applications, and the identifier information includes at least one of an application name of an application, time of an interaction scenario, or a quantity of times in an interaction scenario.

In a possible implementation, the interaction scenario includes a scenario of picture uploading, picture editing, or picture downloading.

In a possible implementation, the identifier information further includes at least one of a content category of a picture, a geographical location of a picture, a source of a picture, usage of a picture, favorites information of a picture, or preference information of a picture.

In a possible implementation, in the target album interface, a picture or a picture set with identifier information including an application name of the first application is located before a picture or a picture set with identifier information including an application name of another application.

In a possible implementation, the display unit is configured to pop up a dialog box in the first interface in response to the first operation performed by the user to trigger the picture selection button, where the dialog box includes a target album button; and display the target album interface in response to a second operation performed by the user to select the target album button.

In a possible implementation, the display unit is further configured to display, in response to a third operation in which the user selects at least one picture in the target album interface, at least one of time of the at least one selected picture, a geographical location of the at least one selected picture, and a picture associated with the at least one picture.

In a possible implementation, the electronic device further includes a processing unit, configured to upload the at least one picture. The display unit is further configured to: if the picture is successfully uploaded, display a first prompt that the picture is successfully uploaded; or if the picture fails to be uploaded, display a second prompt that the picture fails to be uploaded, where the second prompt includes one or more of the following: a picture format is not supported, a picture size exceeds a first threshold, or a quantity of to-be-uploaded pictures exceeds a second threshold.

In a possible implementation, after the picture is successfully uploaded, the processing unit is further configured to update identifier information of the successfully uploaded picture, and the display unit is further configured to prompt the user with updated identifier information by using the first prompt.

In a possible implementation, the processing unit is further configured to redetermine a display manner of the thumbnails of the at least two pictures or the at least two picture sets in the target album interface based on the updated identifier information.

In a possible implementation, the at least two applications belong to a same application type; the at least two applications belong to a group of applications that are jointly developed, jointly registered, jointly packaged, jointly deployed, or mutually bound; or the at least two applications execute preset logic processing within a preset time period.

In a possible implementation, the processing unit is configured to: control an activity corresponding to the first interface to start an intent, and transfer a URI of a target album in the intent; gain access to a multimedia database based on the URI of the target album, where the multimedia database stores paths of at least two pictures that carry different identifier information or a path of each picture in at least two picture sets that carry different identifier information; obtain, based on the paths of the at least two pictures that carry different identifier information, the at least two pictures that carry different identifier information, or obtain, based on the path of each picture in the at least two picture sets that carry different identifier information, each picture in the at least two picture sets that carry different identifier information; and perform zooming processing on and display, on the display unit, the at least two pictures that carry different identifier information, or perform zooming processing on and display, on the display unit, cover pictures of the at least two picture sets that carry different identifier information.

In a possible implementation, the processing unit is further configured to: in an interaction scenario of each of the at least two applications, write, into the multimedia database, a path of a picture on which logic processing such as picture uploading, picture editing, or picture downloading is performed.

According to a third aspect, an embodiment of this application provides a computer-readable storage medium, including instructions. When the instructions are run on a computer, the computer is enabled to perform any method provided in any one of the first aspect or the possible implementations of the first aspect.

According to a fourth aspect, an embodiment of this application provides a computer program product including instructions. When the computer program product runs on a computer, the computer is enabled to perform any method provided in any one of the first aspect or the possible implementations of the first aspect.

According to a fifth aspect, an embodiment of this application provides a chip system. The chip system includes a processor, and may further include a memory. The chip system is configured to implement any method provided in any one of the first aspect or the possible implementations of the first aspect. The chip system may include a chip, or may include a chip and another discrete device.

According to a sixth aspect, an embodiment of this application further provides a picture selection apparatus. The apparatus may be a processing device, an electronic device, or a chip. The apparatus includes a processor, configured to implement any method provided in any one of the first aspect or the possible implementations of the first aspect. The apparatus may further include a memory, configured to store program instructions and data. The memory may be a memory integrated into the apparatus, or an off-chip memory disposed outside the apparatus. The memory is coupled to the processor. The processor may invoke and execute the program instructions stored in the memory, to implement any method provided in any one of the first aspect or the possible implementations of the first aspect. The apparatus may further include a communications interface, and the communications interface is used by the apparatus to communicate with another device.

BRIEF DESCRIPTION OF DRAWINGS

FIG. 14A is a schematic diagram of displaying even yet further content on an electronic device according to an embodiment of this application;

DETAILED DESCRIPTION

Figure 1:
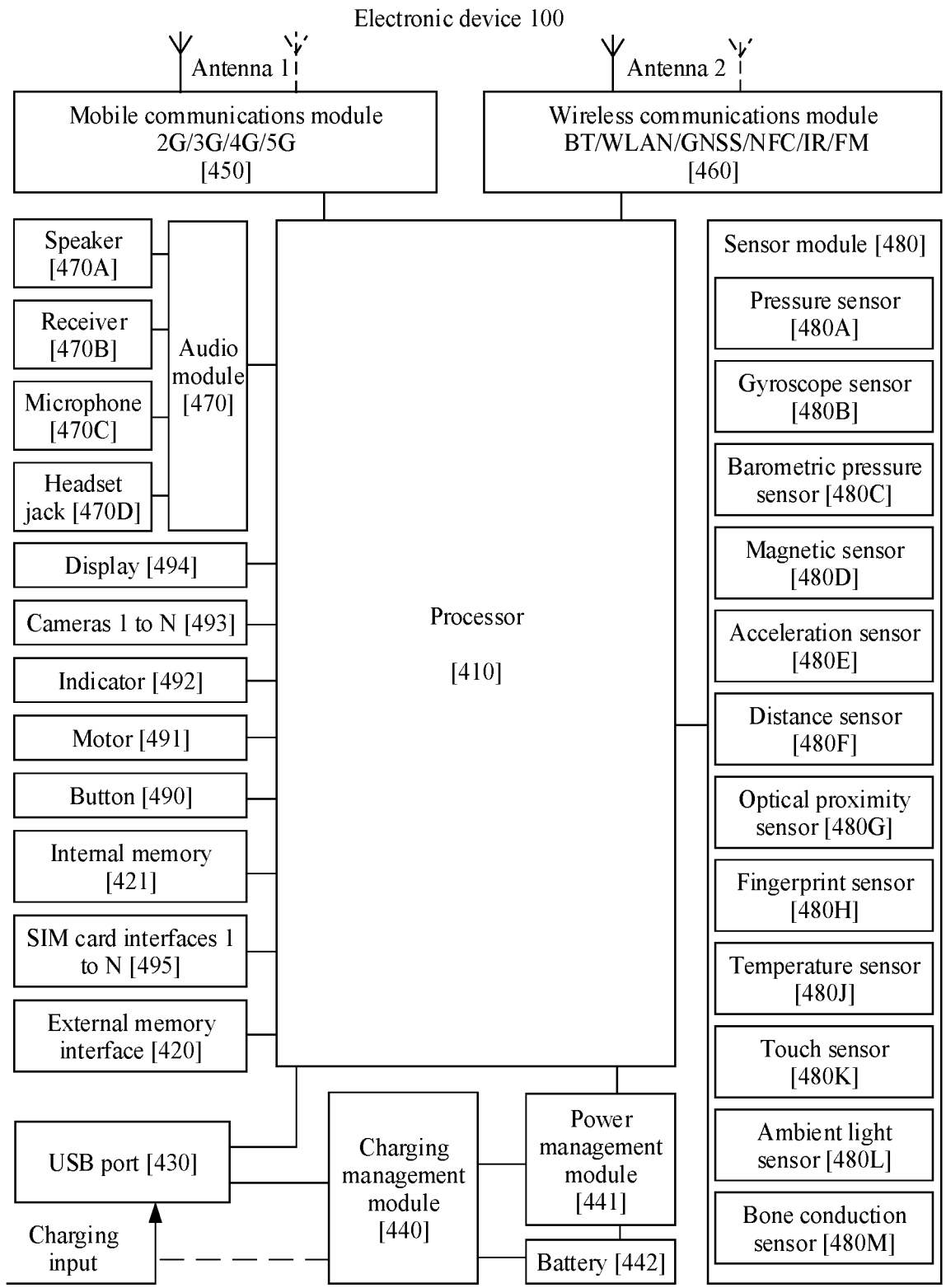
FIG. 1 is a schematic diagram of a structure of an electronic device according to an embodiment of this application.

The following describes the technical solutions in embodiments of this application with reference to accompanying drawings in embodiments of this application. In descriptions of this application, unless otherwise specified, "at least one" means one or more, "at least two" means more, and "a plurality of" means two or more. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity and an execution sequence, and the terms such as "first" and "second" do not indicate a definite difference.

Currently, when a user needs to upload or edit a picture in an app (which may also be referred to as an application or an application program below), the user may select (search for) the picture from a system album (a gallery). However, the system album may store thousands or even tens of thousands of pictures. It is time-consuming for the user to search for the required picture from so many pictures and is inefficient and inconvenient. Therefore, some apps may store, by using a folder, a picture recently operated by the user. When the user needs to reselect the picture in the current app, the user may search for the picture from the folder which stores the picture. This prevents the user from reselecting the picture from the massive pictures in the system album. However, the user can select only the picture that has been recently operated in the current application, a selection range is small, and cross-application access cannot be implemented. For example, if a user recently uploads a photo of an identify card to a bank app, when the user wants to upload the photo of the identify card to an Alipay app, the user can only search for the photo of the identity card from massive pictures in a system album because the user cannot gain access to, in the Alipay app, a folder created by the bank app for storing the picture. For another example, it is assumed that a user recently updates a group of carefully typeset pictures in a chat application. If the user wants to share the same typeset pictures in a blog application, the user can only reselect the picture in the system album because the user cannot gain access to, in the blog application, a folder created by the chat application for storing the pictures. This is time-consuming and inefficient and inconvenient.

Embodiments of this application provide a picture selection method. When a user selects a picture in an interaction scenario of a first application, a target album interface may be displayed. The target album interface includes thumbnails of at least two pictures that carry different identifier information or at least two picture sets that carry different identifier information. Identifier information of a picture or identifier information of a picture set is generated in interaction scenarios of at least two applications. The interaction scenario includes a scenario of picture uploading, picture editing, or picture downloading. In this way, the user can select the picture across applications (that is, gain access to, in the interaction scenario of the current application, the picture processed in an interaction scenario of another application), and does not need to select the picture from massive pictures in a system album, so that the user can select the picture more quickly and more pertinently, thereby reducing time for the user to select the picture and improving user experience.

For example, an electronic device in embodiments of this application may be a mobile phone, a tablet computer, a desktop computer, a laptop computer, a handheld computer, a notebook computer, an ultra-mobile personal computer (UMPC), a netbook, a cellular phone, a personal digital assistant (PDA), or an augmented reality (AR) device/a virtual reality (VR) device. A specific form of the electronic device is not specifically limited in embodiments of this application.

The following describes implementations of embodiments of this application in detail with reference to the accompanying drawings.

FIG. 1 is a schematic diagram of a structure of an electronic device 100 according to an embodiment of this application. As shown in FIG. 1, the electronic device 100 may include a processor 410, an external memory interface 420, an internal memory 421, a universal serial bus (USB) port 430, a charging management module 440, a power management module 441, a battery 442, an antenna 1, an antenna 2, a mobile communications module 450, a wireless communications module 460, an audio module 470, a speaker 470A, a receiver 470B, a microphone 470C, a headset jack 470D, a sensor module 480, a button 490, a motor 491, an indicator 492, a camera 493, a display 494, a subscriber identity module (SIM) card interface 495, and the like. The sensor module 480 may include a pressure sensor 480A, a gyroscope sensor 480B, a barometric pressure sensor 480C, a magnetic sensor 480D, an acceleration sensor 480E, a distance sensor 480F, an optical proximity sensor 480G, a fingerprint sensor 480H, a temperature sensor 480J, a touch sensor 480K, an ambient light sensor 480L, a bone conduction sensor 480M, and the like.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented in hardware, software, or a combination of software and hardware.

The processor 410 may include one or more processing units. For example, the processor 410 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device 100. The controller may generate an operation control signal based on an instruction operation code and a time sequence signal, to control to read instructions and execute instructions.

A memory may be disposed in the processor 410, and is configured to store an instruction and data. In some embodiments, the memory in the processor 410 is a cache memory. The memory may store an instruction or data that has just been used or is cyclically used by the processor 410. If the processor 410 needs to use the instruction or data again, the processor 410 may invoke the instruction or data directly from the memory. This avoids repeated access and reduces waiting time of the processor 410. Therefore, system efficiency is improved.

In some embodiments, the processor 410 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules shown in this embodiment is merely used as an example for description, and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 440 is configured to receive a charging input from a charger. The charger may be a wireless charger or a wired charger. In some embodiments of wired charging, the charging management module 440 may receive a charging input from the wired charger through the USB port 430. In some embodiments of wireless charging, the charging management module 440 may receive a wireless charging input through a wireless charging coil of the electronic device 100. When charging the battery 442, the charging management module 440 may further supply power to the electronic device by using the power management module 441.

The power management module 441 is configured to connect the battery 442, the charging management module 440, and the processor 410. The power management module 441 receives an input from the battery 442 and/or the charging management module 440, and supplies power to the processor 410, the internal memory 421, the external memory, the display 494, the camera 493, the wireless communications module 460, and the like. The power management module 441 may be further configured to monitor parameters such as a battery capacity, a battery cycle count, and a battery health status (electric leakage or impedance). In some other embodiments, the power management module 441 may alternatively be disposed in the processor 410. In some other embodiments, the power management module 441 and the charging management module 440 may alternatively be disposed in a same component.

A wireless communication function of the electronic device 100 may be implemented through the antenna 1, the antenna 2, the mobile communications module 450, the wireless communications module 460, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 450 may provide a wireless communication solution that includes 2G/3G/4G/5G or the like and that is applied to the electronic device 100. The mobile communications module 450 may include at least one filter, a switch, a power amplifier, a low noise amplifier (LNA), and the like. The mobile communications module 450 may receive an electromagnetic wave through the antenna 1, perform processing such as filtering and amplification on the received electromagnetic wave, and transmit a processed electromagnetic wave to the modem processor for demodulation. The mobile communications module 450 may further amplify a signal obtained after modulation by the modem processor, and convert the signal into an electromagnetic wave through the antenna 1 for radiation. In some embodiments, at least some function modules of the mobile communications module 450 may be disposed in the processor 410. In some embodiments, at least some function modules of the mobile communications module 450 and at least some modules of the processor 410 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (not limited to the speaker 470A, the receiver 470B, or the like), or displays an image or a video on the display 494. In some embodiments, the modem processor may be an independent component. In some other embodiments, the modem processor may be independent of the processor 410, and is disposed in a same component with the mobile communications module 450 or another function module.

The wireless communications module 460 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like and that is applied to the electronic device 100. The wireless communications module 460 may be one or more components integrating at least one communication processing module. The wireless communications module 460 receives an electromagnetic wave through the antenna 2, performs frequency modulation and filtering processing on the electromagnetic wave signal, and sends a processed signal to the processor 410. The wireless communications module 460 may further receive a to-be-sent signal from the processor 410, perform frequency modulation and amplification on the signal, and convert the signal into an electromagnetic wave through the antenna 2 for radiation.

In some embodiments, in the electronic device 100, the antenna 1 and the mobile communications module 450 are coupled, and the antenna 2 and the wireless communications module 460 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 494, the application processor, and the like. The GPU is a microprocessor for image processing, and is connected to the display 494 and the application processor. The GPU is configured to perform mathematical and geometric calculation, and render an image. The processor 410 may include one or more GPUs that execute program instructions to generate or change display information.

The display 494 is configured to display an image, a video, and the like. The display 494 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like.

The electronic device 100 can implement a photographing function by using the ISP, the camera 493, the video codec, the GPU, the display 494, the application processor, and the like.

The ISP is configured to process data fed back by the camera 493. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts a processed electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 493.

The camera 493 is configured to capture a still image or a video. An optical image of an object is generated through the lens, and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 493, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 can play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a biological neural network structure, for example, by referring to a mode of transfer between human brain neurons, and may further continuously perform self-learning. Applications such as intelligent cognition of the electronic device 100, for example, image recognition, facial recognition, speech recognition, and text understanding, may be implemented through the NPU.

The external memory interface 420 may be configured to connect to an external memory card, for example, a micro SD card, to extend a storage capability of the electronic device 100. The external storage card communicates with the processor 410 through the external memory interface 420, to implement a data storage function. For example, files such as music and videos are stored in the external memory card. In this embodiment of this application, the external storage card (for example, a Micro SD card) may be used to store all pictures in a system album. The micro SD card is usually open to a user, and the user may freely delete and access the pictures in the system album.

The internal memory 421 may be configured to store computer-executable program code, where the computer-executable program code includes instructions. The processor 410 runs the instructions stored in the internal memory 421, to perform various function applications of the electronic device 100 and data processing. For example, in this embodiment of this application, the processor 410 may execute the instructions stored in the internal memory 421, and display corresponding display content on the display 494 in response to an operation performed by a user on the display 494. The internal memory 421 may include a program storage area and a data storage area. The program storage area may store an operating system, an application (for example, a sound playing function or an image playing function) required by at least one function, and the like. The data storage area may store data (for example, audio data and an address book) and the like created when the electronic device 100 is used. In addition, the internal memory 421 may include a high-speed random access memory, and may further include a nonvolatile memory, for example, at least one magnetic disk storage device, a flash memory, and a universal flash storage (UFS), a read-only memory (ROM). In this embodiment of this application, a path and identifier information (including identifier information of a picture or identifier information of a picture set) of a picture in a target album interface may be stored in the internal memory. Through reading the path of the picture, the picture may be obtained from the external memory and loaded to the internal memory, and the picture or the picture set may be displayed according to a corresponding rule or manner based on the identifier information.

The electronic device 100 may implement an audio function, for example, music playing and recording, by using the audio module 470, the speaker 470A, the receiver 470B, the microphone 470C, the headset jack 470D, the application processor, and the like.

The audio module 470 is configured to convert digital audio information into an analog audio signal for output, and is also configured to convert an analog audio input into a digital audio signal. The audio module 470 may be configured to encode and decode an audio signal. In some embodiments, the audio module 470 may be disposed in the processor 410, or some function modules of the audio module 470 may be disposed in the processor 410. The speaker 470A, also referred to as a "loudspeaker", is configured to convert an audio electrical signal into a sound signal. The electronic device 100 may listen to music or answer a call in a hands-free mode over the speaker 470A. The receiver 470B, also referred to as an "earpiece", is configured to convert an audio electrical signal into a sound signal. When a call is answered or audio information is listened to by using the electronic device 100, the receiver 470B may be put close to a human ear to listen to a voice. The microphone 470C, also referred to as a "mike" or a "mic", is configured to convert a sound signal into an electrical signal. When making a call or sending voice information or triggering the electronic device 100 by using a voice assistant to perform some functions, the user may make a sound through a mouth by approaching the microphone 470C, and type the sound signal to the microphone 470C. At least one microphone 470C may be disposed in the electronic device 100. In some other embodiments, two microphones 470C may be disposed in the electronic device 100, to collect a sound signal and implement a noise reduction function. In some other embodiments, three, four, or more microphones 470C may alternatively be disposed in the electronic device 100, to collect a sound signal, implement noise reduction, and identify a sound source, so as to implement a directional recording function and the like.

The headset jack 470D is configured to connect to a wired headset. The headset jack 470D may be the USB port 430, or may be a 3.5 mm open mobile terminal platform (OMTP) standard interface, or a cellular telecommunications industry association of the USA (CTIA) standard interface.

The pressure sensor 480A is configured to sense a pressure signal, and can convert the pressure signal into an electrical signal. In some embodiments, the pressure sensor 480A may be disposed on the display 494. There are a plurality of types of pressure sensors 480A, such as a resistive pressure sensor, an inductive pressure sensor, and a capacitive pressure sensor. The capacitive pressure sensor may include at least two parallel plates made of conductive materials. When a force is applied to the pressure sensor 480A, capacitance between electrodes changes. The electronic device 100 determines pressure intensity based on a capacitance change. When a touch operation is performed on the display 494, the electronic device 100 detects intensity of the touch operation by using the pressure sensor 480A. The electronic device 100 may calculate a touch position based on a detection signal of the pressure sensor 480A. In some embodiments, touch operations that are performed at a same touch position but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating an SMS message is executed.

The gyroscope sensor 480B may be configured to determine a motion posture of the electronic device 100. In some embodiments, an angular velocity of the electronic device 100 about three axes (namely, x, y, and z axes) may be determined by using the gyroscope sensor 480B. The gyroscope sensor 480B may be configured for stabilization during photographing. For example, when a shutter is pressed, the gyroscope sensor 480B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 480B may be further used in a navigation scenario and a motion-sensing game scenario. In this embodiment of this application, the display 494 of the electronic device 100 may be folded to be a plurality of screens. Each screen may include a gyroscope sensor 480B, configured to measure an orientation (namely, a direction vector of the orientation) of a corresponding screen. The electronic device 100 may determine an included angle between adjacent screens based on an angular change of an orientation of each screen that is obtained through measurement.

The barometric pressure sensor 480C is configured to measure barometric pressure. In some embodiments, the electronic device 100 calculates an altitude based on a barometric pressure value measured by the barometric pressure sensor 480C, to assist in positioning and navigation.

The magnetic sensor 480D includes a Hall sensor. The electronic device 100 may detect opening and closing of a flip cover by using the magnetic sensor 480D. In some embodiments, when the electronic device 100 is a clamshell phone, the electronic device 100 may detect opening and closing of a flip cover by using the magnetic sensor 480D. Further, a feature such as automatic unlocking of the flip cover is set based on a detected opening or closing state of the leather case or a detected opening or closing state of the flip cover.

The acceleration sensor 480E may detect values of accelerations in various directions (usually on three axes) of the electronic device 100, and may detect magnitude and a direction of gravity when the electronic device 100 is still. The acceleration sensor may be further configured to identify a posture of the electronic device, and is used in an application such as switching between a landscape mode and a portrait mode or a pedometer. It should be noted that, in this embodiment of this application, the display 494 of the electronic device 100 may be folded to be a plurality of screens. Each screen may include an acceleration sensor 480E, configured to measure an orientation (namely, a direction vector of the orientation) of a corresponding screen.

The distance sensor 480F is configured to measure a distance. The electronic device 100 may measure the distance in an infrared or a laser manner. In some embodiments, in a photographing scenario, the electronic device 100 may measure a distance by using the distance sensor 480F, to implement quick focusing.

The optical proximity sensor 480G may include, for example, a light-emitting diode (LED) and a light detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device may determine that there is an object near the electronic device 100. When insufficient reflected light is detected, the electronic device 100 may determine that there is no object near the electronic device 100. The electronic device 100 may detect, by using the optical proximity sensor 480G, that a user holds the electronic device 100 close to an ear for a call, to automatically turn off a screen for power saving. The optical proximity sensor 480G may also be used in a leather case mode or a pocket mode to automatically unlock or lock the screen.

The ambient light sensor 480L is configured to sense ambient light brightness. The electronic device 100 may adaptively adjust brightness of the display 494 based on the sensed ambient light brightness. The ambient light sensor 480L may also be configured to automatically adjust a white balance during photographing. The ambient light sensor 480L may further cooperate with the optical proximity sensor 480G to detect whether the electronic device 100 is in a pocket, to prevent an accidental touch.

The fingerprint sensor 480H is configured to capture a fingerprint. The electronic device 100 may use a feature of the collected fingerprint to implement fingerprint-based unlocking, application lock access, fingerprint-based photographing, fingerprint-based call answering, and the like.

The temperature sensor 480J is configured to detect a temperature. In some embodiments, the electronic device 100 executes a temperature processing policy based on the temperature detected by the temperature sensor 480J. For example, when the temperature reported by the temperature sensor 480J exceeds a threshold, the electronic device 100 lowers performance of a processor located near the temperature sensor 480J, to reduce power consumption to implement thermal protection. In some other embodiments, when the temperature is less than another threshold, the electronic device 100 heats the battery 442 to prevent the electronic device 100 from being shut down abnormally due to a low temperature. In some other embodiments, when the temperature is less than still another threshold, the electronic device 100 boosts an output voltage of the battery 442, to avoid abnormal shutdown due to a low temperature.

The touch sensor 480K is also referred to as a "touch panel". The touch sensor 480K may be disposed on the display 494. The touch sensor 480K and the display 494 form a touchscreen, which is also referred to as a "touch screen". The touch sensor 480K is configured to detect a touch operation performed on or near the touch sensor. The touch sensor may transfer the detected touch operation to the application processor, to determine a type of a touch event. A visual output related to the touch operation may be provided on the display 494. In some other embodiments, the touch sensor 480K may alternatively be disposed on a surface of the electronic device 100 at a position different from a position of the display 494.

The bone conduction sensor 480M may obtain a vibration signal. In some embodiments, the bone conduction sensor 480M may obtain a vibration signal of a vibration bone of a human vocal part. The bone conduction sensor 480M may also be in contact with a human pulse, and receive a blood pressure beating signal. In some embodiments, the bone conduction sensor 480M may also be disposed in the headset, to obtain a bone conduction headset. The audio module 470 may obtain a speech signal through parsing based on the vibration signal that is of the vibration bone of the vocal-cord part and that is obtained by the bone conduction sensor 480M, to implement a speech function. The application processor may parse heart rate information based on the blood pressure beating signal obtained by the bone conduction sensor 480M, to implement a heart rate detection function.

The button 490 includes a power-on button, a volume button, and the like. The button 490 may be a mechanical button, or may be a touch-sensitive button. The electronic device 100 may receive a button input, and generate a button signal input related to user setting and function control of the electronic device 100.

The motor 491 may generate a vibration prompt. The motor 491 may be used for an incoming call vibration prompt, or may be used for touch vibration feedback. For example, touch operations performed on different applications (for example, photographing and audio playing) may correspond to different vibration feedback effects. The motor 491 may also correspond to different vibration feedback effects for touch operations performed on different areas of the display 494. Different application scenarios (for example, a time reminder, information receiving, an alarm clock, and a game) may also correspond to different vibration feedback effects. A touch vibration feedback effect may alternatively be customized.

The indicator 492 may be an indicator light, and may be used to indicate a charging status or a power change, or may be used to indicate a message, a missed call, a notification, or the like.

The SIM card interface 495 is configured to connect a SIM card. The SIM card may be inserted into the SIM card interface 495 or removed from the SIM card interface 495, to implement contact with or separation from the electronic device 100. The electronic device 100 may support one or N SIM card interfaces, where N is a positive integer greater than 1. The SIM card interface 495 can support a nano-SIM card, a micro-SIM card, a SIM card, and the like. A plurality of cards may be simultaneously inserted into a same SIM card interface 495. The plurality of cards may be of a same type, or may be of different types. The SIM card interface 495 is applicable to different types of SIM cards. The SIM card interface 495 may also be compatible with the external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

All methods in the following embodiments may be implemented on the electronic device 100 having the foregoing hardware structure.

For ease of understanding, the following describes, with reference to the accompanying drawings, the picture selection method provided in embodiments of this application.

Figure 2:
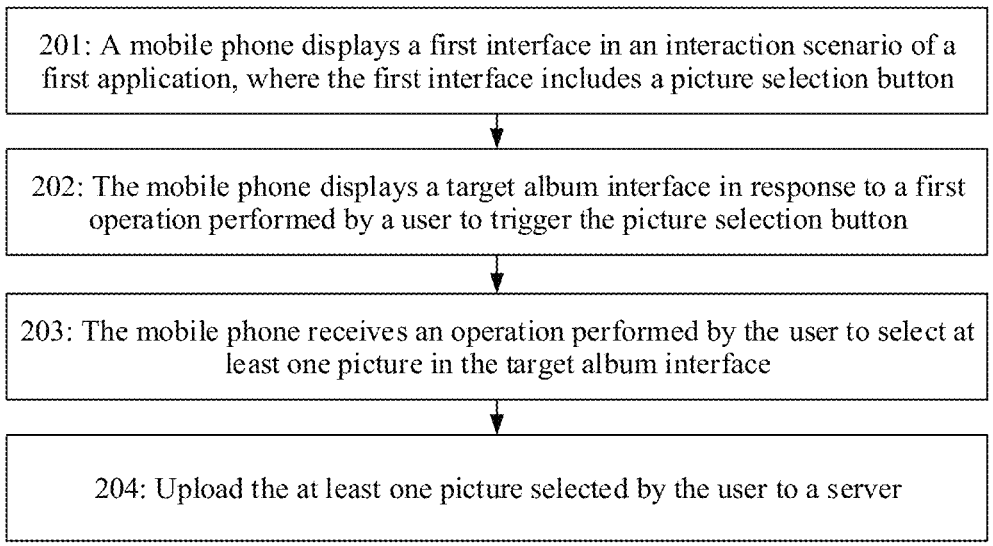
FIG. 2 is a schematic flowchart of a picture selection method according to an embodiment of this application.

FIG. 2 shows a picture selection method provided in an embodiment of this application. An example in which an electronic device is a mobile phone is used for description. The method includes the following steps:

201: The mobile phone displays a first interface in an interaction scenario of a first application, where the first interface includes a picture selection button.

The interaction scenario may include interaction scenarios such as picture uploading, picture editing (beautification and/or cropping), or picture downloading. In the picture uploading interaction scenario, picture uploading logic processing can be performed on a picture selected by a user. In the picture editing interaction scenario, picture editing logic processing can be performed on a picture selected by a user. In the picture downloading interaction scenario, picture downloading logic processing can be performed. The interaction scenario may be a scenario in which an application records data or operates recorded data.

The first interface may be an interface with various applications (for example, a chat application, a blog application, a cloud disk application, a game application, a wealth management application, and a bank application) that can upload or edit a picture. The interface may include the picture selection button, and the picture selection button is used for selecting a picture. Certainly, the picture selection button may alternatively be a button or a control, for example, a picture sending button, a file selection button, a picture sharing button, a picture uploading button, or a picture editing button, that can invoke a target album interface. This is not limited in this application.

Figure 3:
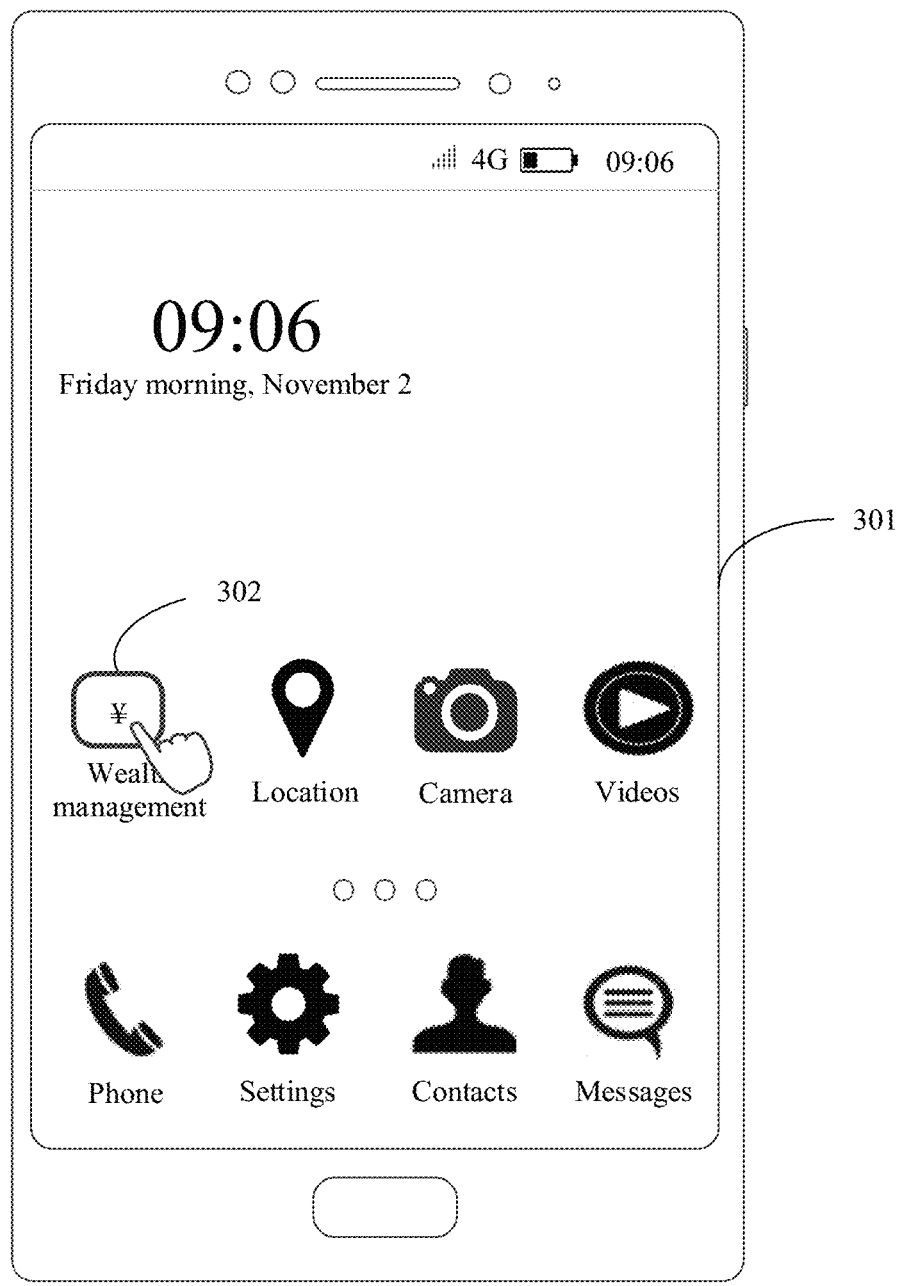
FIG. 3 is a schematic diagram of displaying content on an electronic device according to an embodiment of this application.

For example, as shown in FIG. 3, a user may tap an icon 302 of a wealth management app on a mobile phone in an interface 301. After detecting the operation in which the user taps the icon 302 of the wealth management app in the interface 301, the mobile phone may start the wealth management app. When logging in to the wealth management app for the first time, the user needs to register personal information. As shown in FIG. 4(*a*), the user may register personal information, for example, a name and an age, in a personal information registration interface 401 (namely, the first interface). The user may further select a picture, for example, a picture of a front side and a back side of an identity card of the user, by using a picture selection button 402.

Optionally, the user may open a web page or an applet interface (an H5 page) by using an app (for example, a browser app), and select a picture on the web page or the H5 page and upload the picture. To be specific, the first interface may be an application interface, or may be a web page interface or an applet interface. This is not limited in this application.

202: The mobile phone displays the target album interface in response to a first operation performed by the user to trigger the picture selection button.

The mobile phone may directly display the target album interface in response to the first operation performed by the user to trigger the picture selection button. Alternatively, before displaying the target album interface, the mobile phone may pop up a dialog box in the first interface. The dialog box includes a target album button, and the target album button is a function button for triggering opening of a target album. The mobile phone displays the target album interface on a display in response to a second operation performed by the user to select the target album button. The second operation on the target album button may include a tap operation, a slide operation, a touch and hold operation, and the like. The tap operation may include a single tap operation, a continuous tap operation, and the like. This is not limited in this application. Optionally, the dialog box further includes a system album button and/or a photograph button.

For example, as shown in FIG. 4(*a*), the user may tap the picture selection button 402. The mobile phone may pop up a dialog box (dialog) 403 in response to the operation in which the user taps the picture selection button 402, as shown in FIG. 4(*b*). The dialog box 403 includes a target album button 404, a system album button 405, and a photograph button 406. A system album includes various pictures stored in mobile phone memory, for example, a picture photographed by using a camera, a downloaded picture, and a picture obtained through screenshot. A target album includes pictures that are uploaded, edited, or downloaded in at least two applications, and the target album may be considered as a sub-album of the system album. It may be understood that names of albums (for example, the system album and the target album) in this embodiment of this application are merely examples. The system album may also be referred to as a common album, a native album, all pictures, or the like. The target album may also be referred to as a historical upload album, a historical record album, a historical download album, or the like. This is not limited in this application.

If the user selects the system album button 405, the user may select a picture from the system album. If the user selects the photograph button 406, the mobile phone may turn on a camera and jump from the current application (for example, the wealth management app) to a photographing application. The user may directly photograph or scan the front side and the back side of the identity card. After photographing, the mobile phone may return to the wealth management application from the photographing application.

If the user selects the target album button 404, the mobile phone may display a target album interface. The target album interface includes thumbnails of at least two pictures that carry different identifier information or at least two picture sets that carry different identifier information.

The identifier information of the at least two pictures or the identifier information of the at least two picture sets is generated based on interaction scenarios of at least two applications, that is, identifier information of a picture or a picture set is generated based on an interaction scenario. An interaction scenario of each of the at least two applications may include an interaction scenario such as picture uploading, picture editing, or picture downloading. Corresponding logic processing may be performed in a corresponding interaction scenario. For details, refer to related descriptions in step 201. In the corresponding interaction scenario, the mobile phone may generate identifier information for a picture on which logic processing such as uploading, editing, or downloading has been performed.

The identifier information may include at least one of an application name of an application, time of an interaction scenario, or a quantity of times in an interaction scenario. A first picture is used as an example. The first picture is one of the at least two pictures with different identifiers. Identifier information of the first picture may include at least one of an application name of an application in which logic processing is performed on the first picture, time of performing corresponding logic processing in a corresponding interaction scenario (interaction scenario time), or a quantity of times of performing logic processing on a picture in an interaction scenario (a quantity of times in an interaction scenario). The quantity of times of performing logic processing on the picture may include a quantity of times of performing logic processing on the picture in interaction scenarios of all applications (for example, if the picture is uploaded twice in a chat application, edited once in a picture retouching application, and uploaded once in a blog application, there are a total of four times of performing logic processing on the picture), a quantity of times of performing logic processing on the picture in an interaction scenario of each application, or a quantity of times of performing corresponding logic processing on the picture in interaction scenarios of a same application (for example, the picture is uploaded twice and edited once in a chat application).

Identifier information of a first picture set includes at least one of an application name of an application in which logic processing is performed on all pictures in the first picture set, time of performing logic processing in an interaction scenario, or a quantity of times of performing logic processing in an interaction scenario. The first picture set may be one of the at least two picture sets with different identifiers.

In addition, the thumbnails (or picture sets) of the at least two pictures that carry different identifier information may include a thumbnail of a picture (or a picture set) that does not carry any identifier information and a thumbnail of a picture (or a picture set) that carries identifier information. To be specific, carrying no identifier information may be considered as carrying special identifier information, or carrying empty identifier information.

The mobile phone may display a thumbnail of a picture or a picture set in the target album interface based on identifier information. For example, in some embodiments, the mobile phone may display thumbnails of one or more pictures or one or more picture sets on the display based on application names.

Figure 5:
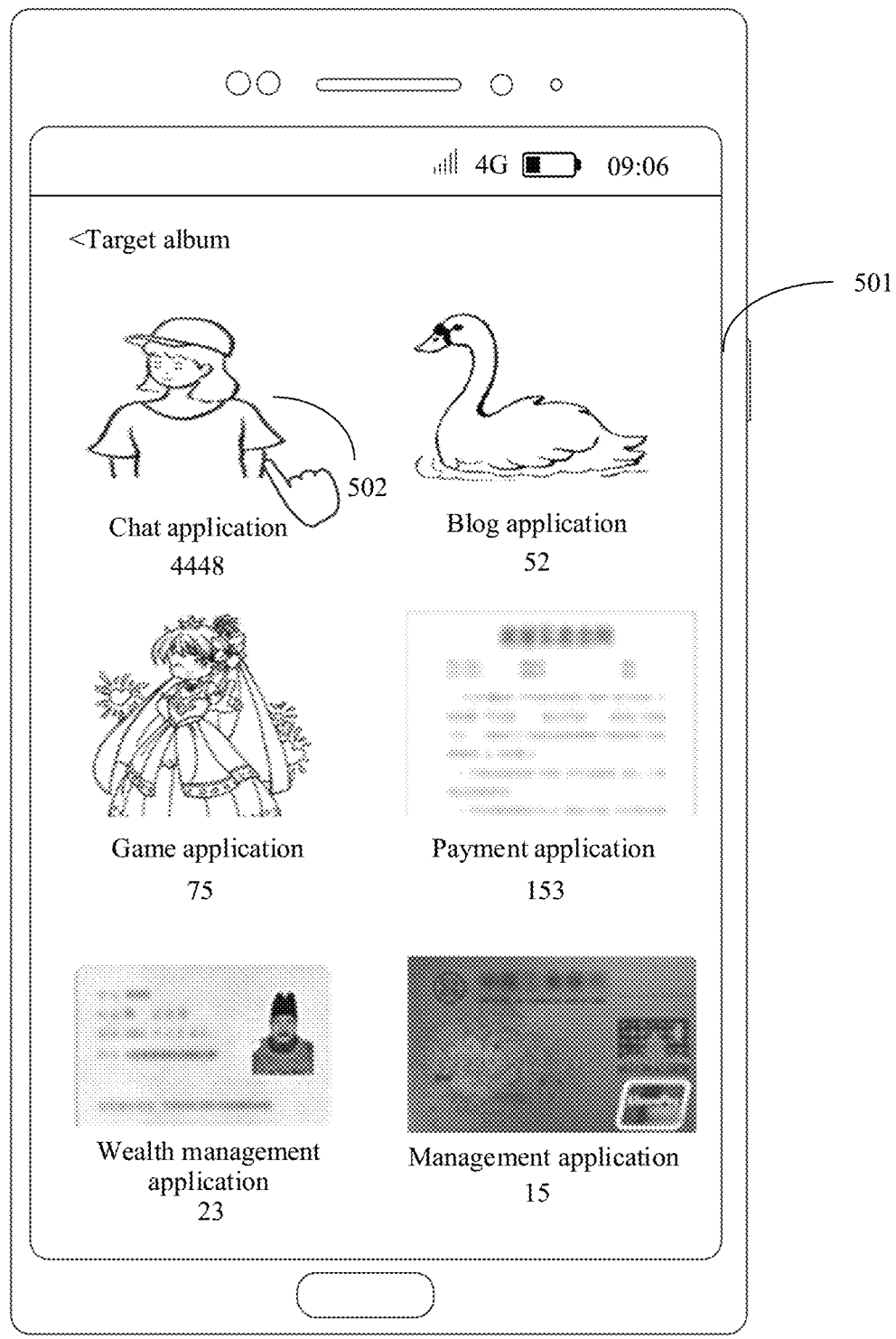
FIG. 5 is a schematic diagram of displaying further content on an electronic device according to an embodiment of this application.

For example, the mobile phone displays a picture set. As shown in FIG. 5, a mobile phone may display a target album interface 501. In the target album interface 501, the mobile phone may separately display picture sets corresponding to applications such as a chat application, a blog application, a game application, a payment application, a wealth management application, and a management application. An application name corresponding to each picture set is identifier information carried with the picture set. A cover picture corresponding to each application may be a picture that is the latest or earliest uploaded/edited/downloaded by a user in the application.

In this way, the user can select the to-be-uploaded picture across applications (that is, gain access to, in the current application, the picture processed by another application), and does not need to select the picture from the massive pictures in the system album, so that the user can select the picture more quickly and pertinently, thereby reducing time for the user to select the picture and improving user experience.

Optionally, the mobile phone may further display a quantity of pictures in each picture set. As shown in FIG. 5, there are 4448 pictures on which corresponding logic processing (including uploading, editing, downloading, or the like) has been performed in an interaction scenario of the chat application, there are 52 pictures on which corresponding logic processing has been performed in an interaction scenario of the blog application, there are 75 pictures on which corresponding logic processing has been performed in an interaction scenario of the game application, there are 153 pictures on which corresponding logic processing has been performed in an interaction scenario of the payment application, there are 23 pictures on which corresponding logic processing has been performed in an interaction scenario of the wealth management application, and there are 15 pictures on which corresponding logic processing has been performed in an interaction scenario of the management application.

Optionally, if the mobile phone displays a picture set based on an application name, when the user selects a picture from a picture set corresponding to an application, the user may further view the picture based on a time sequence in which logic processing is performed on the picture in an interaction scenario of the application; or view the picture based on a quantity of times of performing logic processing on the picture in the interaction scenario of the application.

In some embodiments, the mobile phone may display a thumbnail of a picture or a picture set based on time of an interaction scenario. For example, the mobile phone may display thumbnails of one or more pictures or one or more picture sets on the display based on a time sequence (for example, upload time) in which logic processing is performed on the pictures in the interaction scenario. For example, the mobile phone may display thumbnails of one or more pictures or one or more picture sets on the display based on a time sequence of uploading the pictures. Alternatively, the mobile phone may not distinguish between logic processing types. As long as a picture has been performed logic processing (for example, uploading, editing, or downloading) in an interaction scenario of an application, the mobile phone may identify corresponding processing time for the picture, and display the picture based on the processing time. Time of performing logic processing on each picture in a picture set is the same (for example, dates are the same, that is, logic processing is performed on a same day).

Figure 6:
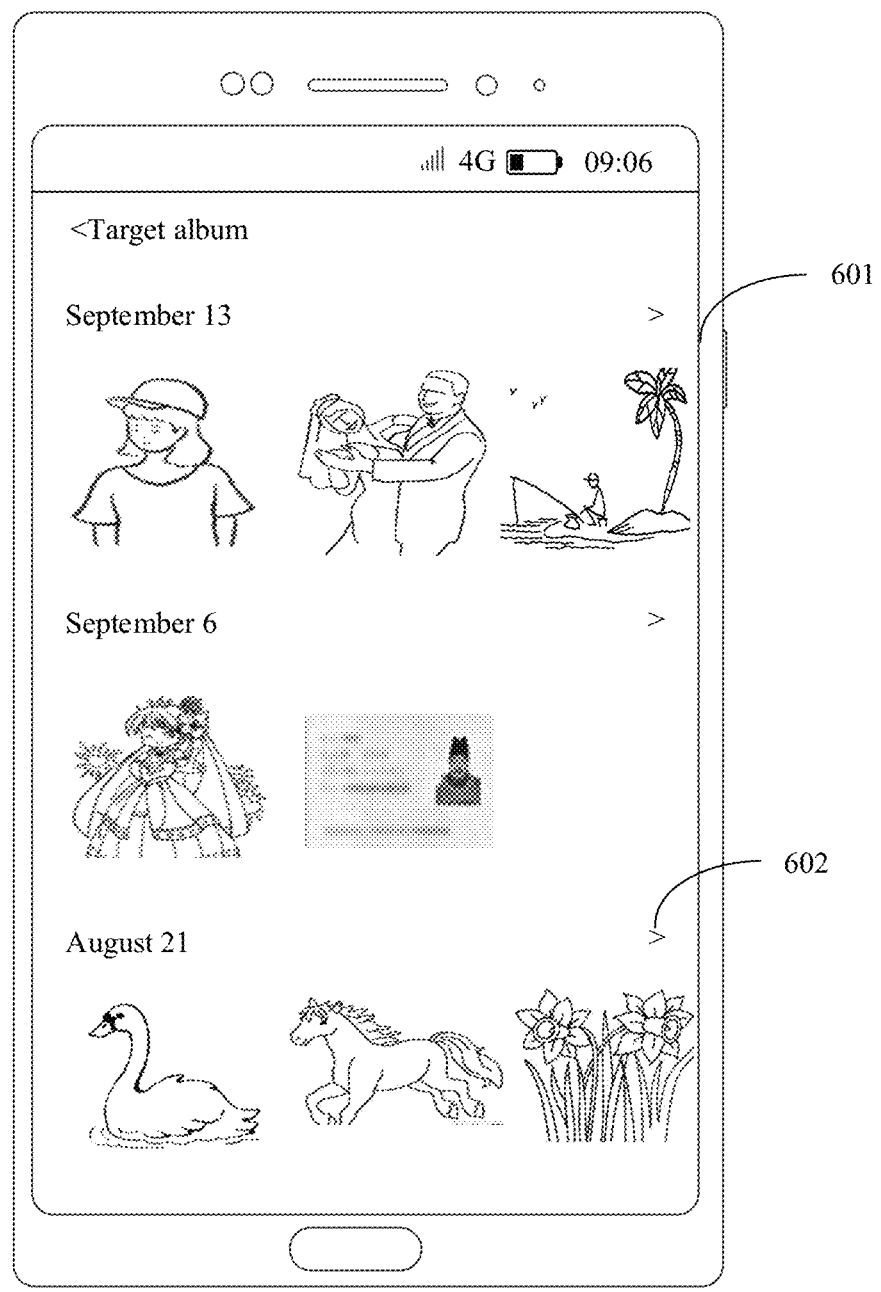
FIG. 6 is a schematic diagram of displaying still other content on an electronic device according to an embodiment of this application.

For example, as shown in FIG. 6, a mobile phone may display a target album interface 601. In the target album interface 601, the mobile phone may display, starting from most recently processing time (for example, September 13) of performing logic processing on a picture, thumbnails of a plurality of pictures on which logic processing has been performed on different dates. For example, the mobile phone may separately display thumbnails of a plurality of pictures on which logic processing has been performed on dates such as September 13, September 6, and August 21. The user may tap a control on the right of a date to view more pictures uploaded on the date. For example, the user may tap a control 602 to view more pictures uploaded on August 21. Optionally, the mobile phone may further display more detailed time information, for example, information such as year, morning, afternoon, hour, minute, or second. This is not limited herein.

A picture set corresponding to each date may include pictures on which logic processing has been performed in one or more applications. For example, a picture set corresponding to September 13 may include a picture uploaded (published) in a chat application and a picture edited in a picture retouching application. For another example, a picture set corresponding to September 6 may include only pictures uploaded to a cloud disk application. Optionally, the user may further view an application name corresponding to each picture.

In this way, the user can select the to-be-uploaded picture across applications (that is, gain access to, in the current application, a picture that has been processed in another application) based on the time sequence of performing logic processing on the picture, and does not need to select the picture from massive pictures in the system album, thereby reducing time for the user to select the picture and improving user experience.

Optionally, if logic processing is separately performed on a picture at different time (the logic processing may be performed in a same application, or in different applications), for example, the picture is separately uploaded on September 13 and September 6, the picture may be placed only in a picture set corresponding to the most recently upload date (September 13), to avoid repeatedly displaying the same picture and reducing processing power consumption of the mobile phone. Alternatively, the picture may be separately placed in picture sets corresponding to different dates (September 13 and September 6), so as to prompt the user that the picture has been uploaded for a plurality of times.

In some embodiments, the mobile phone may display thumbnails of one or more pictures or one or more picture sets on the display based on a quantity of times in an interaction scenario (a quantity of times of performing logic processing on a picture in an interaction scenario). For example, the mobile phone may display a picture or a picture set on the display based on a quantity of uploading times/a quantity of editing times/a quantity of downloading times of the picture. Alternatively, the mobile phone may not distinguish between logic processing types. As long as a picture has been performed logic processing (for example, uploading, editing, or downloading) in an interaction scenario of an application, the mobile phone may identify corresponding processing times for the picture, and display the picture based on the processing times.

Figure 7A:
FIG. 7(a) and FIG. 7(b) are a schematic diagram of displaying still further content on an electronic device according to an embodiment of this application.
Figure 7B:
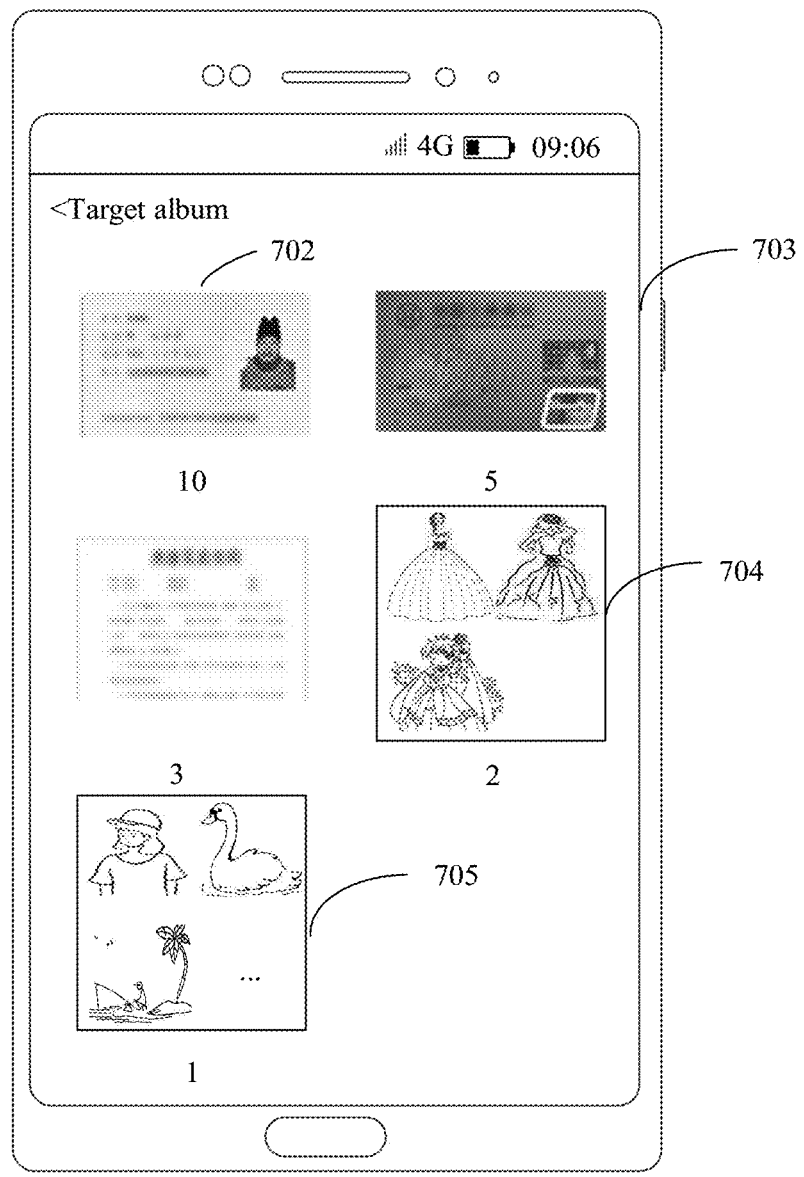

For example, as shown in FIG. 7(a), a mobile phone may display a target album interface 701. The target album interface 701 may display, starting from a picture that is uploaded for the largest quantity of times (for example, a picture 702 that is uploaded for 10 times), thumbnails of different pictures in descending order of upload times. Alternatively, as shown in FIG. 7(b), a target album interface 703 may display, starting from a picture that is uploaded for the largest quantity of times, thumbnails of different pictures in descending order of upload times. In addition, pictures that are uploaded for a same quantity of times may be placed in a same picture set. For example, a picture that is uploaded twice may be displayed in a picture set 704, and a picture that is uploaded once may be displayed in a picture set 705. It should be noted that one picture set may alternatively include only one picture. For example, it may be considered that the picture 702 is a unique picture in a picture set that is uploaded for 10 times.

In this way, the user can select the to-be-uploaded picture across applications based on the quantity of times of performing logic processing on the picture. For example, a picture that is uploaded for a larger quantity of times is more likely to be uploaded again, so that the user can select the picture more quickly and pertinently, thereby reducing time for the user to select the picture and improving user experience.

In a possible design, the identifier information further includes at least one of a content category of a picture, a geographical location of a picture, a source of a picture, usage of a picture, favorites information of a picture, or preference information of a picture. The usage of the picture includes picture replacing, publishing the picture in Moments, verifying personal identity information, uploading the picture to a cloud for storage, and the like. The favorites information of the picture includes information such as an application name, time, and a location of an application when the picture is added to favorites. The preference information of the picture may be determined based on a quantity of times that the picture is added to favorites, a quantity of uploaded times, a quantity of downloaded times, or a quantity of edited times. A picture that meets a preset condition may be considered as a picture that the user likes. The preset condition may be, for example, that the picture is added to favorites twice or edited three times.

For example, if the mobile phone displays a picture or a picture set based on an application name, when the user selects a picture from a picture set corresponding to an application, the mobile phone may further receive a corresponding operation (a fourth operation) of the user. The fourth operation is used to view, based on a content category of the picture, the picture on which logic processing has been performed by the application; the fourth operation is used to view, based on a geographical location of the picture, the picture on which logic processing has been performed by the application, the fourth operation is used to view, based on a source of the picture, the picture on which logic processing has been performed by the application, or the fourth operation is used to view, based on usage of the picture, the picture on which logic processing has been performed by the application.

Figure 8A:
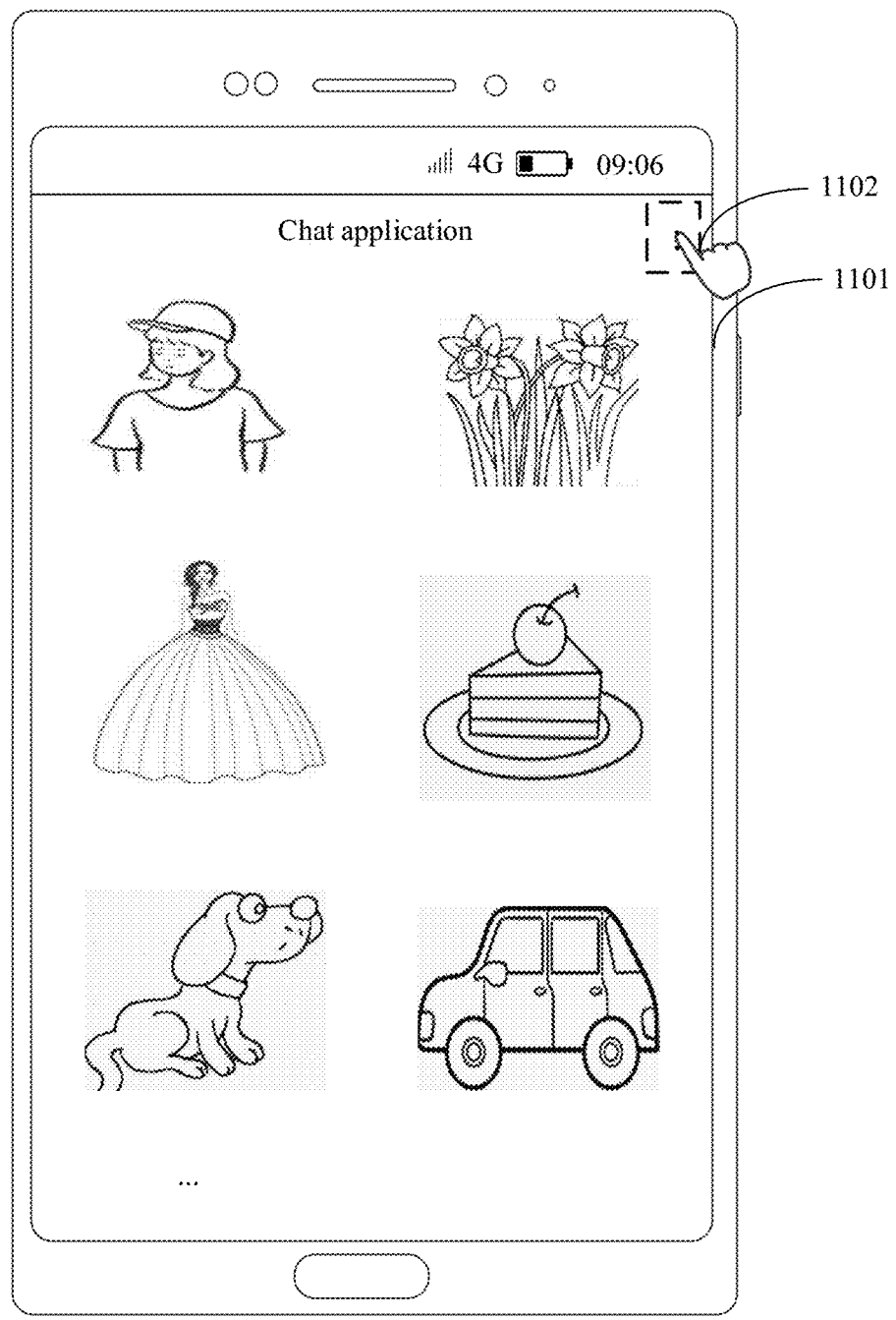
FIG. 8(a) and FIG. 8(b) are a schematic diagram of displaying yet other content on an electronic device according to an embodiment of this application.
Figure 8B:
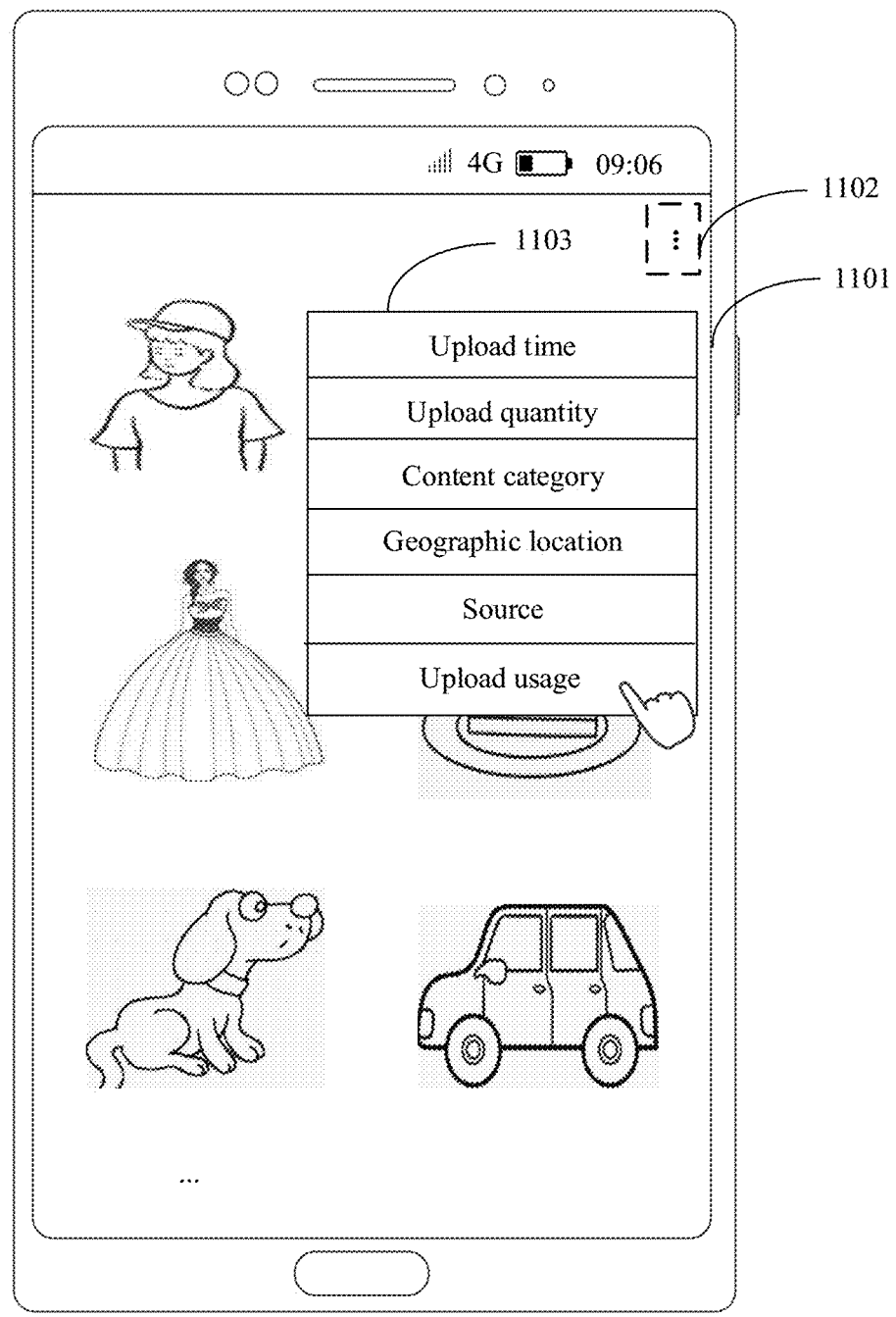

For example, as shown in FIG. 8(a), the mobile phone may display, in response to an operation in which the user taps a picture 502 as shown in FIG. 5, an interface 1101 corresponding to the chat application. As shown in FIG. 8(b), the mobile phone may pop up a dialog box 1103 in response to an operation in which the user taps a control 1102. The dialog box 1103 includes a plurality of function items, such as upload time, upload times, a content category, a geographical location, a source, and upload usage.

Figure 9:
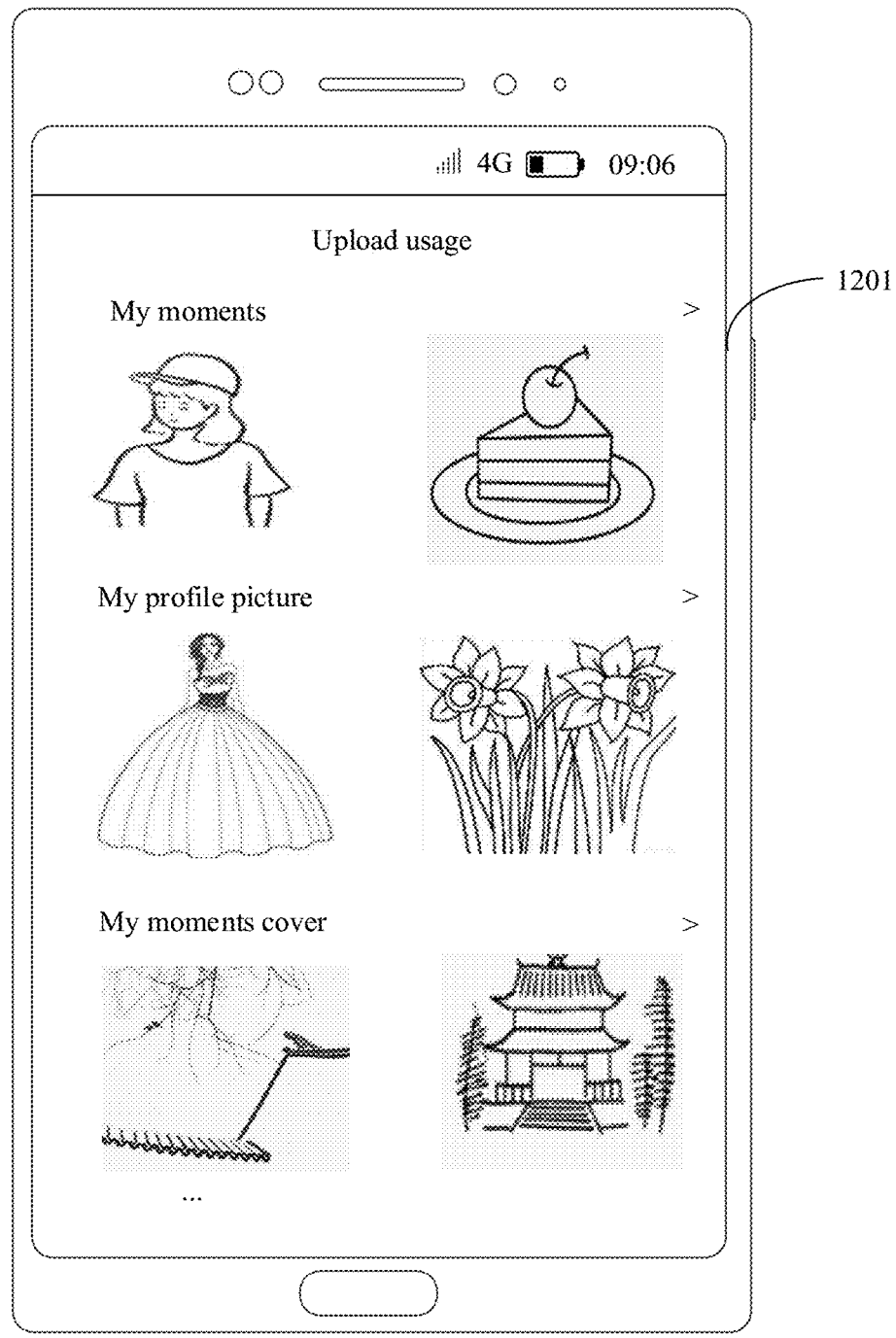
FIG. 9 is a schematic diagram of displaying yet further content on an electronic device according to an embodiment of this application.

For example, as shown in FIG. 9, the mobile phone may display, in response to an operation in which the user taps the upload usage item, an interface 1201 corresponding to the upload usage. The upload usage may include "My Moments" (namely, a picture published by the user in Moments), "My profile picture" (a chat profile picture used by the user), "My Moments cover" (a Moments cover/topic used by the user), and the like. The user may select the picture from pictures corresponding to different upload usages. This facilitates the user to select the picture.

Figure 10A:
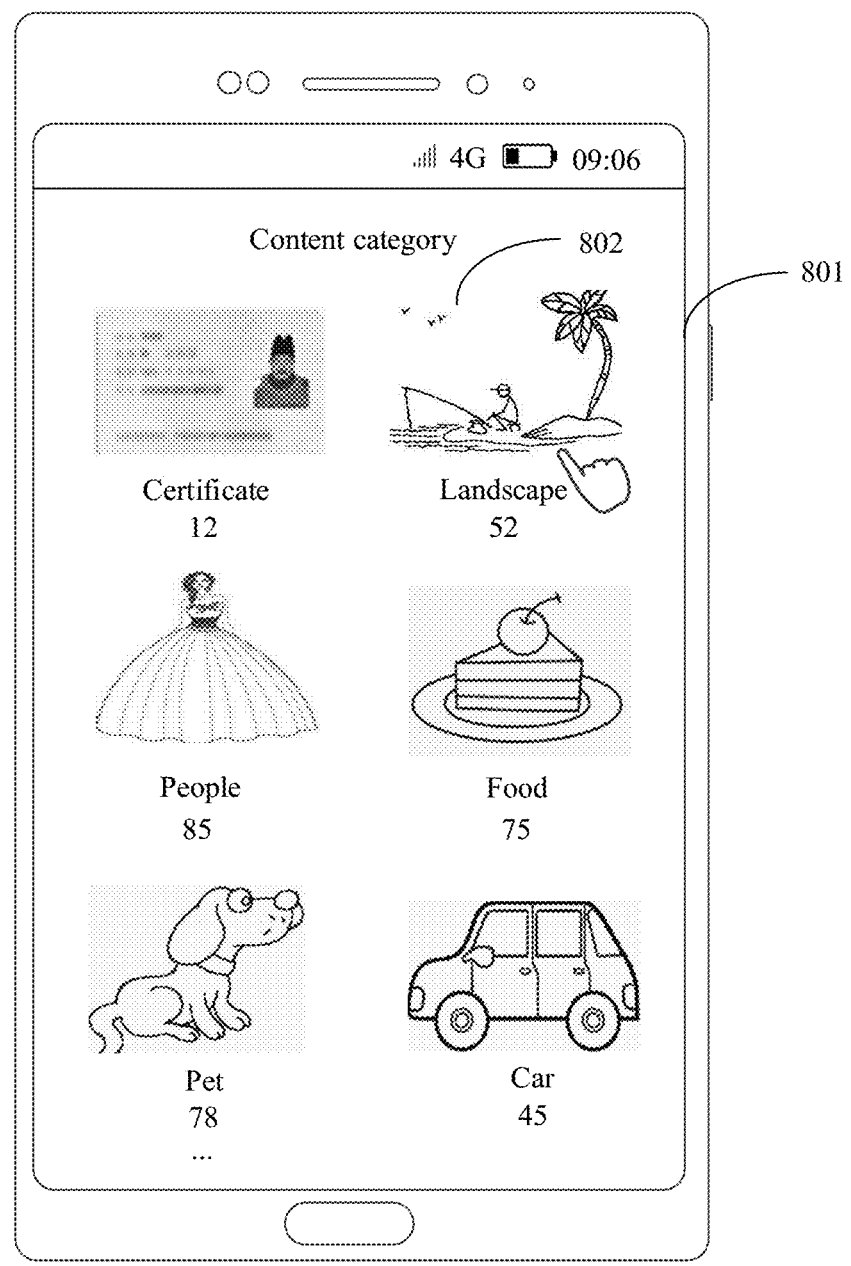
FIG. 10(a) and FIG. 10(b) are a schematic diagram of displaying even other content on an electronic device according to an embodiment of this application.
Figure 10B:
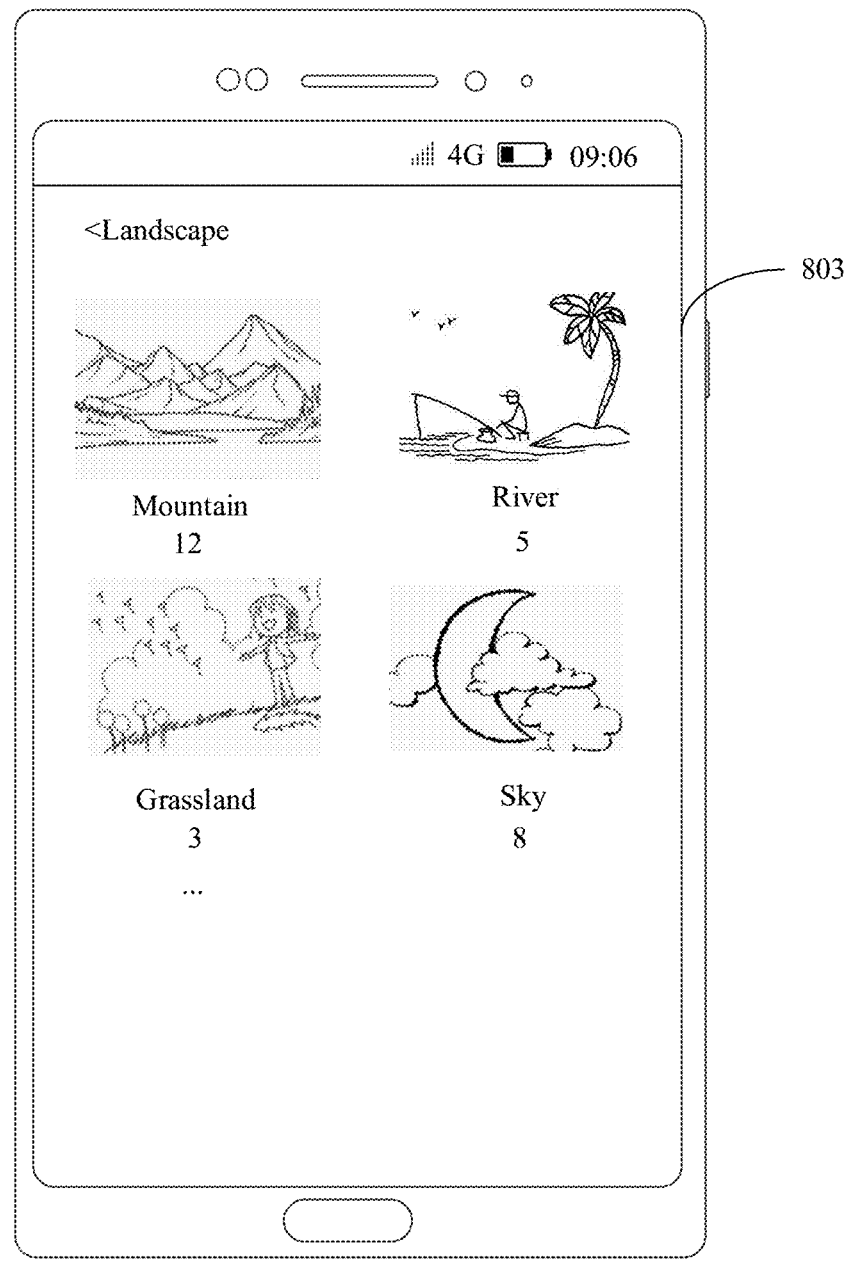

For example, as shown in FIG. 10(a), the mobile phone may display a content category interface 801 in response to an operation in which the user taps the content category item. The content category interface 801 may display a picture based on a content category. The content category of the picture may include at least one of a certificate picture, a people picture, a landscape picture, a food picture, a pet picture, a home picture, a building picture, a car picture, and a file picture (FIG. 10(a) and FIG. 10(b) show only some content categories). The certificate picture may include pictures of a front side and a back side of an identity card, pictures of a front side and a back side of a bank card, a picture of a Beijing entry certificate, a picture of a license plate number, and the like. The file picture may include various contract signing pictures, book cover pictures or content pictures, document (for example, a word document or a PDF document) screenshots, and the like.

Optionally, the mobile phone may further display a quantity of pictures in each content category. As shown in FIG. 10(a), there are 12 pictures of the certificate type, there are 52 pictures of the landscape type, there are 85 pictures of the people type, there are 75 pictures of the food type, there are 78 pictures of the pet type, and there are 45 pictures of the car type.

Optionally, the content categories such as the certificate, the landscape, the people, the food, the pet, and the car may further include subtypes. For example, the pictures of the certificate type may further include subtypes such as a picture of an identity card, a picture of a bank card, a picture of a Beijing entry certificate, and a picture of a license plate number, the pictures of the landscape type may further include subtypes such as a mountain, a river, a grassland, and the sky, the pictures of the people type may be classified into different subtypes based on different facial information (one type of facial information may correspond to one subtype), the pictures of the food type may include a hot pot, a cake, seafood, and the like, the pictures of the pet type may include a dog, a cat, a rabbit, a tortoise, a bird, and the like, and the pictures of the car type may include a sedan, a sports car, a van, an off-road car, and the like. The user may tap a picture of a corresponding type to view a subtype of the picture of this type. For example, the user may tap a picture 802 of the landscape type. As shown in FIG. 10(b), the mobile phone may display a landscape interface 803 in response to an operation in which the user taps the picture 802. The landscape interface 803 may include pictures of subtypes such as the mountain, the river, the grassland, and the sky. Optionally, the mobile phone may further display quantities of pictures of various subtypes. For example, there are 12 pictures of the mountain subtype, there are 5 pictures of the river subtype, there are 3 pictures of the grassland subtype, and there are 8 pictures of the sky subtype.

In this way, the user can select the to-be-uploaded picture more intuitively based on the content category of the picture, thereby reducing time for the user to select the picture and improving user experience.

Figure 11:
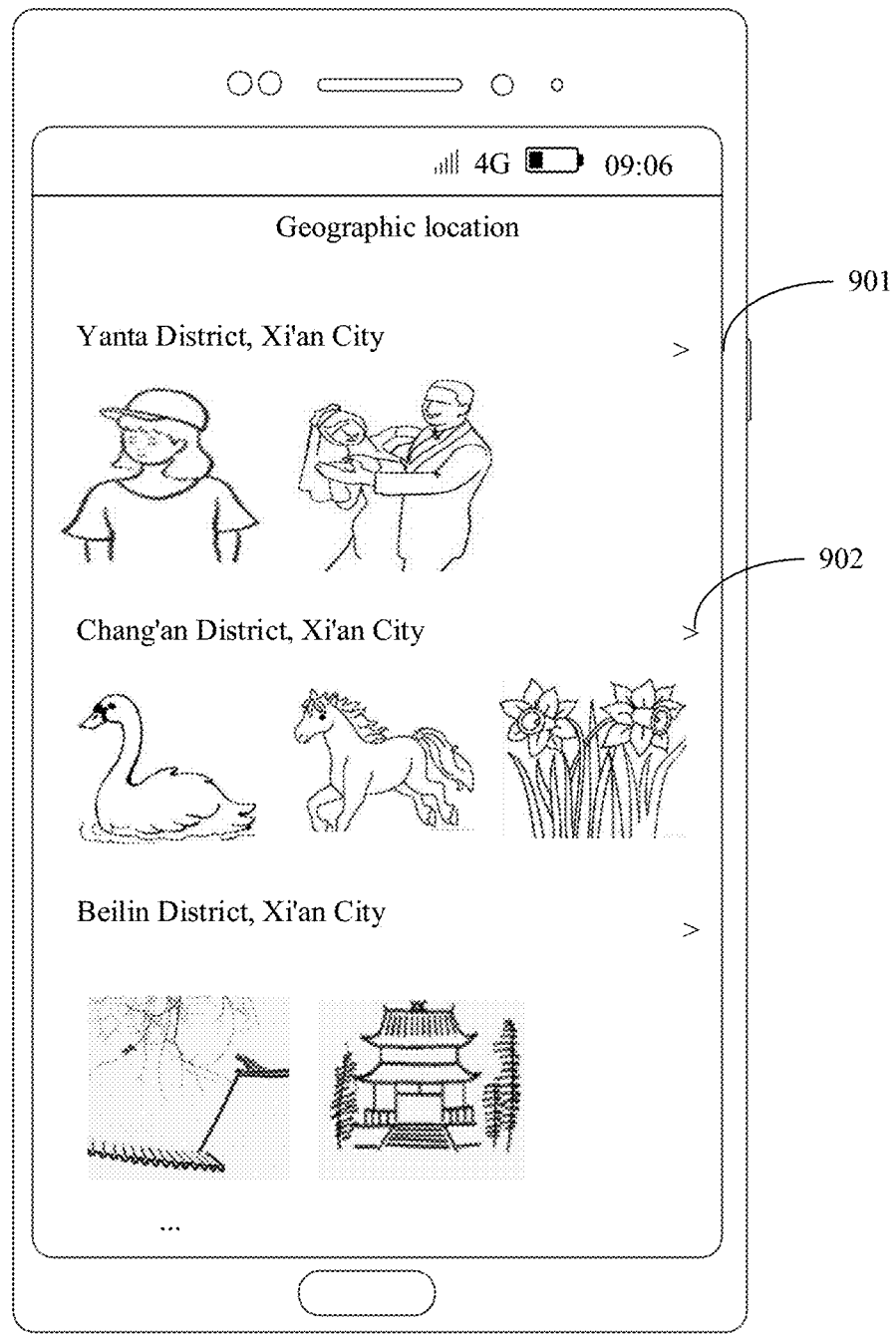
FIG. 11 is a schematic diagram of displaying even further content on an electronic device according to an embodiment of this application.

For example, as shown in FIG. 11, the mobile phone may display a geographical location interface 901 in response to an operation in which the user taps the geographical location item. The geographical location interface 901 may include a picture photographed in Yanta District, Xi'an City, a picture photographed in Chang'an District, Xi'an City, a picture photographed in Beilin District, Xi'an City, and the like. The user may tap a control on the right of a geographical location to view more pictures corresponding to the geographical location. For example, the user may tap a control 902 to view more pictures corresponding to Chang'an District, Xi'an City.

In this way, if the user needs to upload a picture of a geographical location, the user can select the picture from the target album more quickly and pertinently, thereby reducing time for the user to select the picture and improving user experience.

Figure 12:
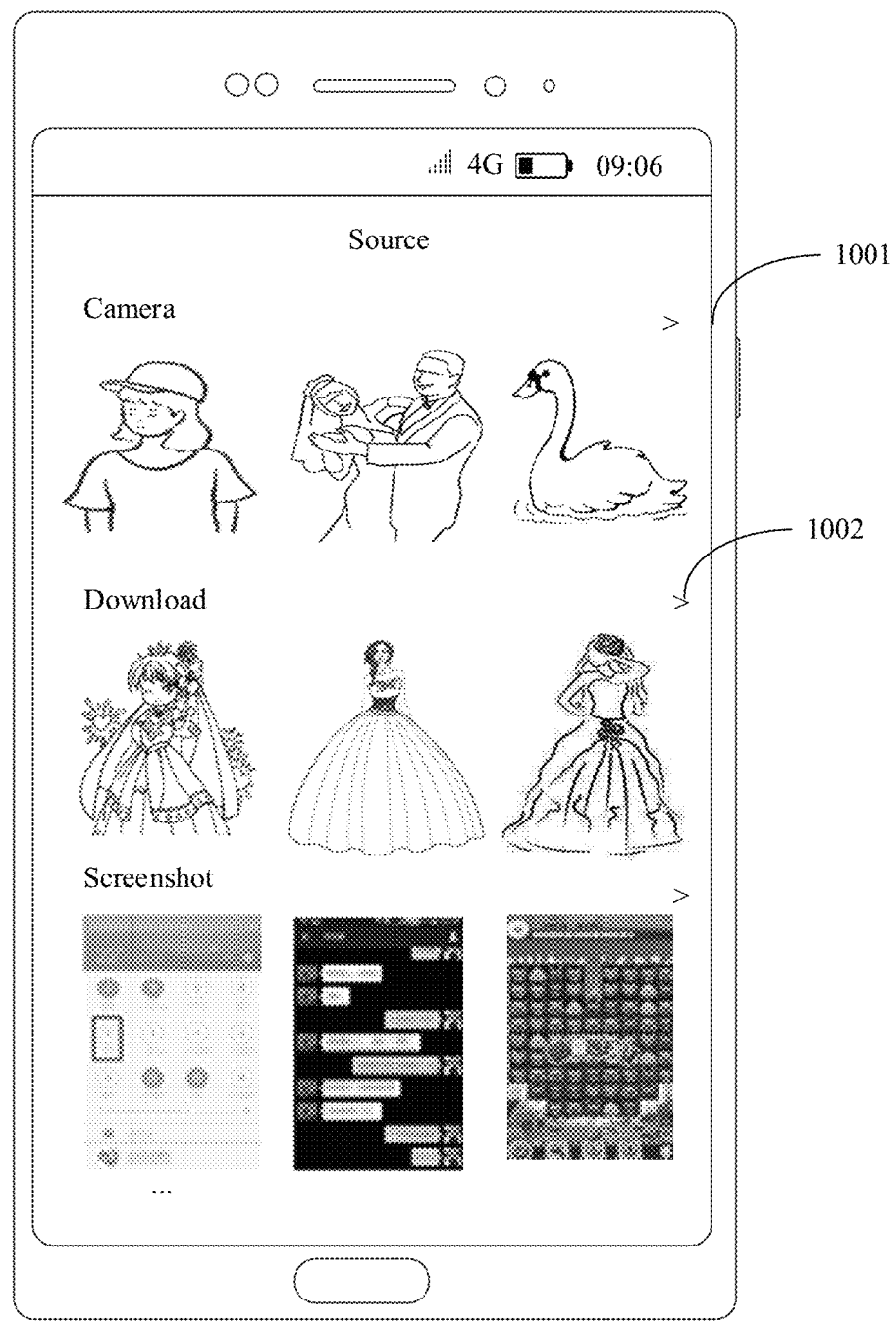
FIG. 12 is a schematic diagram of displaying still yet other content on an electronic device according to an embodiment of this application.

For example, the mobile phone may display a picture on the display based on the source of the picture in response to an operation in which the user taps the source item. The source of the picture may include photographed by a camera, downloaded, screenshot/screen captured, or a local application (for example, the picture has been processed by local picture retouching software on the mobile phone). As shown in FIG. 12, a source interface 1001 may include a picture photographed by a camera, a downloaded picture, a picture obtained through screen capture (screenshot), and the like. The user may tap a control on the right of the source of the picture to view more pictures corresponding to the source of the picture. For example, the user may tap a control 1002 to view more downloaded pictures.

In this way, if the user wants to operate a picture from a specific source (for example, wants to upload a picture photographed by the camera), the user may select the to-be-uploaded picture more quickly and pertinently based on the source of the picture, thereby reducing time for the user to select the picture and improving user experience.

In a possible design, if the pictures or the picture sets are displayed based on the application name, in the target album interface, a picture or a picture set with identifier information including an application name of the first application is located before a picture or a picture set with identifier information including an application name of another application. It may be understood that, when selecting the picture in the first application, the user would be more likely to search for a picture processed by the first application. Therefore, an application name of the first application is displayed in a first place, so that the user preferably searches for the to-be-uploaded picture in the picture processed by the first application, thereby improving user experience.

Figure 13:
FIG. 13 is a schematic diagram of displaying still yet further content on an electronic device according to an embodiment of this application.

For example, it is assumed that the first application is a wealth management application. In response to an operation performed by the user on the target album button 404 displayed in the personal information registration interface 401 of the wealth management application as shown in FIG. 4(b), as shown in FIG. 13, an application name of the wealth management application is located before an application name (for example, a chat application or a blog application) of another application, so that the user preferably searches for the to-be-uploaded picture from pictures uploaded to the wealth management application, thereby improving user experience.

In a possible design, if the picture set is displayed on the display based on the application name, the mobile phone may receive a fifth operation performed by the user to move application names of at least two applications, and display, in response to the fifth operation, the picture set on the display based on an order of the application names after the user moves the application names. Then, when the user selects a picture, the mobile phone may display the picture set based on the order of application names after the user moves the application names. The mobile phone may add arrangement information of an application name to corresponding identifier information. For example, identifier information carried in a picture 1 is an application name of an application A, and the application A is ranked first after being moved. The mobile phone may add the order information to the identifier information of the picture 1. In this way, the user can design, based on a preference or requirement of the user, an arrangement manner of application names (namely, an arrangement manner of pictures or picture sets corresponding to an application), thereby improving user experience.

In a possible design, the at least two applications corresponding to the picture or the picture set in the target album interface (in the interaction scenarios of the at least two applications, identifier information of the picture or the picture set included in the target album interface may be generated) belong to a same application type. For example, the at least two applications may all belong to a shopping application, an information application, a wealth management application, a game application, and the like. In this way, when selecting the picture in the interaction scenario of the first application, the user can select the picture from a picture corresponding to an application of a same type as the first application. Because interaction scenarios of applications of a same type are more similar, the user is more likely to select the required picture from the picture corresponding to the application of the same type, thereby improving user experience. Alternatively, the at least two applications belong to a group of applications that are jointly developed, jointly registered, jointly packaged, jointly deployed, or mutually bound. Therefore, interaction scenarios of such a group of applications are usually associated (for example, a group of jointly developed applications usually require, when verifying user identity information, the user to enter same or similar information). In this way, the user is more likely to select the required picture from pictures corresponding to such the group of applications, thereby improving user experience. Alternatively, the at least two applications execute preset logic processing within a preset time period. The preset time period may be a time period (for example, one week, one month, or three months) before a time point at which the user selects the picture in the interaction scenario of the first application. For example, it is assumed that the preset time period is one month before the time point at which the user performs the picture selection operation. In this month, the user uploads, edits, or downloads pictures in an application 1 to an application 5, and the at least two applications include the application 1 to the application 5. In this way, the user can select the picture from a picture that has been uploaded, edited, or downloaded within the more appropriate time period, which helps the user select the required picture more conveniently and quickly, thereby improving user experience.

203: The mobile phone receives an operation performed by the user to select at least one picture in the target album interface.

Figure 14A:
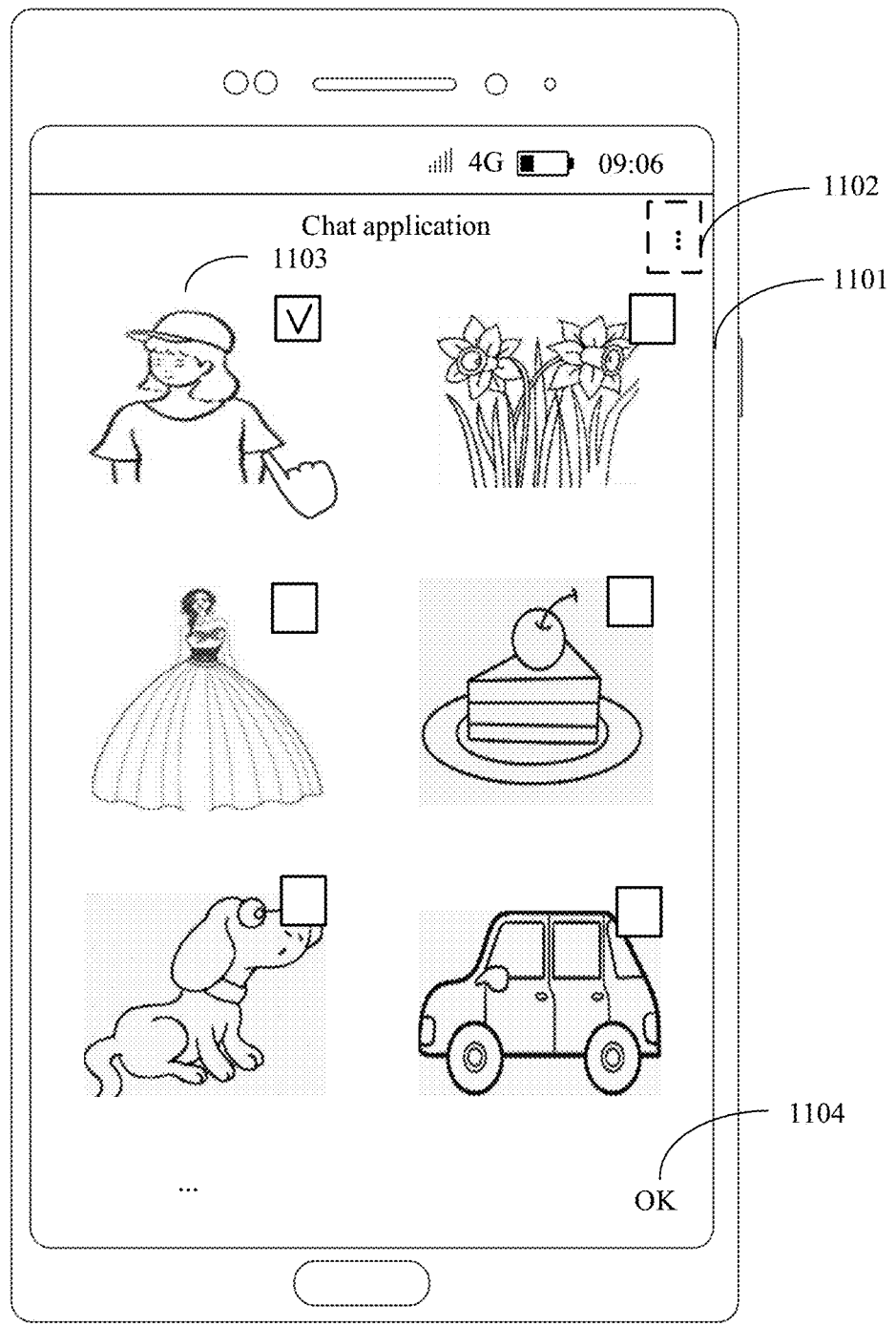
FIG. 14(a) to FIG. 14(f) are a schematic diagram of displaying even yet other content on an electronic device according to an embodiment of this application.
Figure 15A:
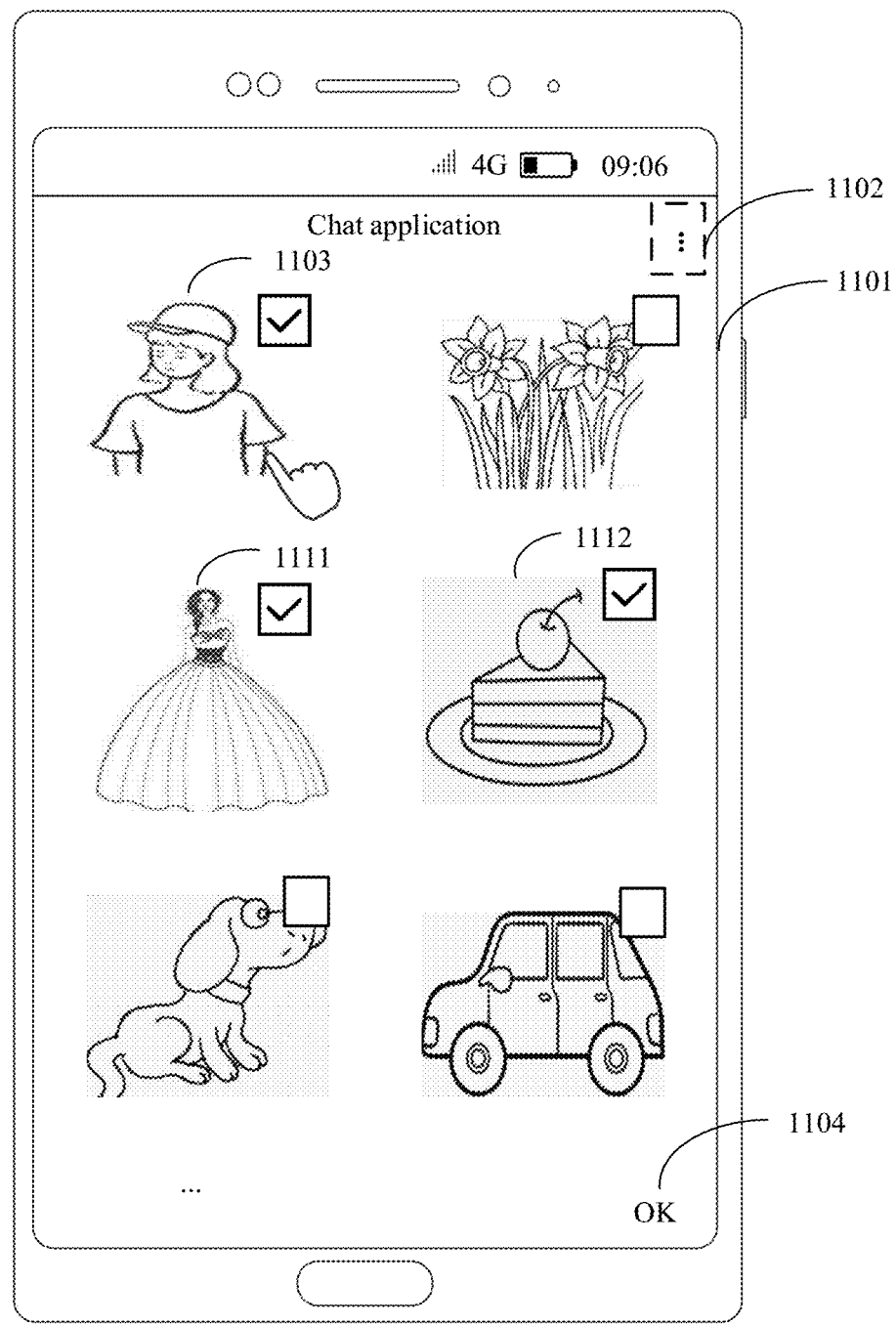
FIG. 15(a) to FIG. 15(d) are a schematic diagram of displaying even still other content on an electronic device according to an embodiment of this application.

The user may select one or more pictures in the target album interface. For example, as shown in FIG. 14(a), a user may select a picture (for example, a picture 1103) in an interface 1101, and the user may touch and hold the picture 1103 to select the picture. For another example, as shown in FIG. 15(a), the user may select a plurality of pictures (for example, a picture 1103, a picture 1111, and a picture 1112) in the interface 1101.

The mobile phone displays, in response to an operation (a third operation) in which the user selects at least one picture in the target album interface, at least one of time of the at least one selected picture, a geographical location of the at least one selected picture, and a picture associated with the at least one picture. The picture associated with the at least one picture may be a picture that is uploaded or edited at the same time, or a picture whose similarity with the selected picture exceeds a preset threshold. For example, as shown in FIG. 14A, when a user selects a picture 1103, a prompt box 1201 may be displayed, to prompt the user of time and a place of the currently selected picture 1103, and associated pictures of the picture 1103. The user can find a required picture more quickly from the associated pictures of the picture 1103, thereby reducing time for the user to select the picture.

Optionally, the mobile phone may receive an operation performed by the user to edit one or more pictures of the at least one picture, for example, cropping, graffiti, or adding a filter. The mobile phone may display an editing result of the one or more pictures in response to the editing operation.

Figure 14B:
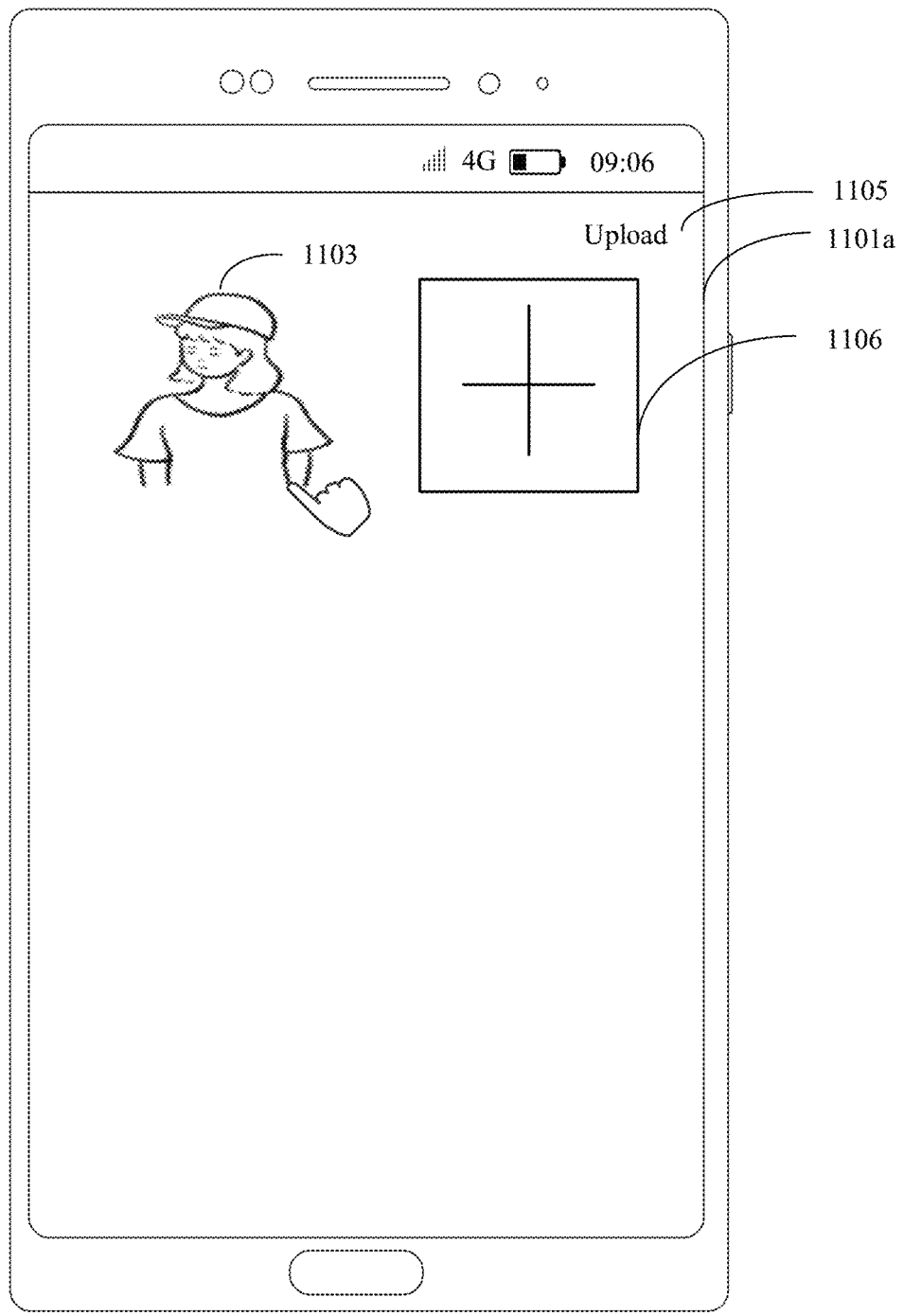
Figure 14C:
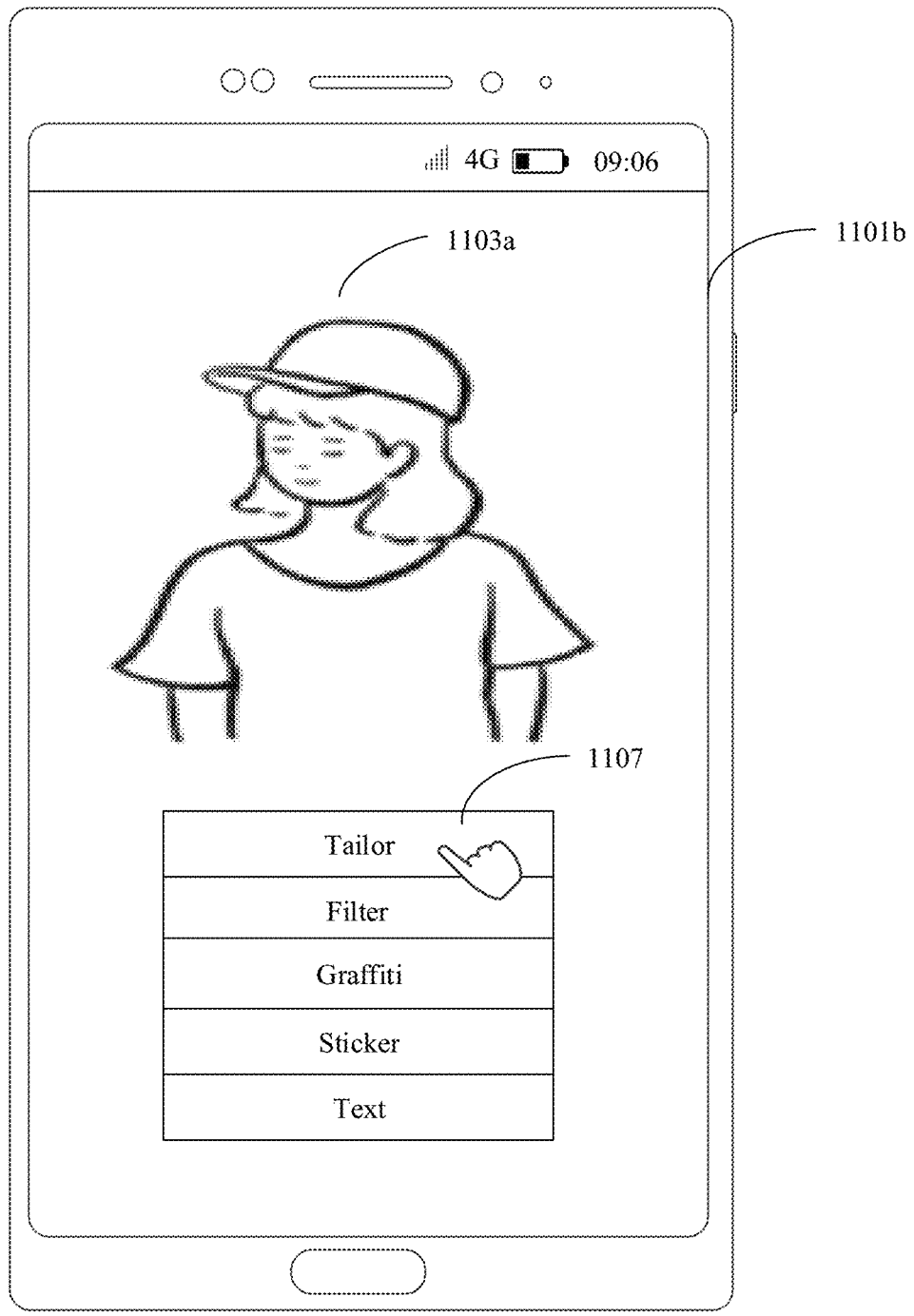
Figure 14D:
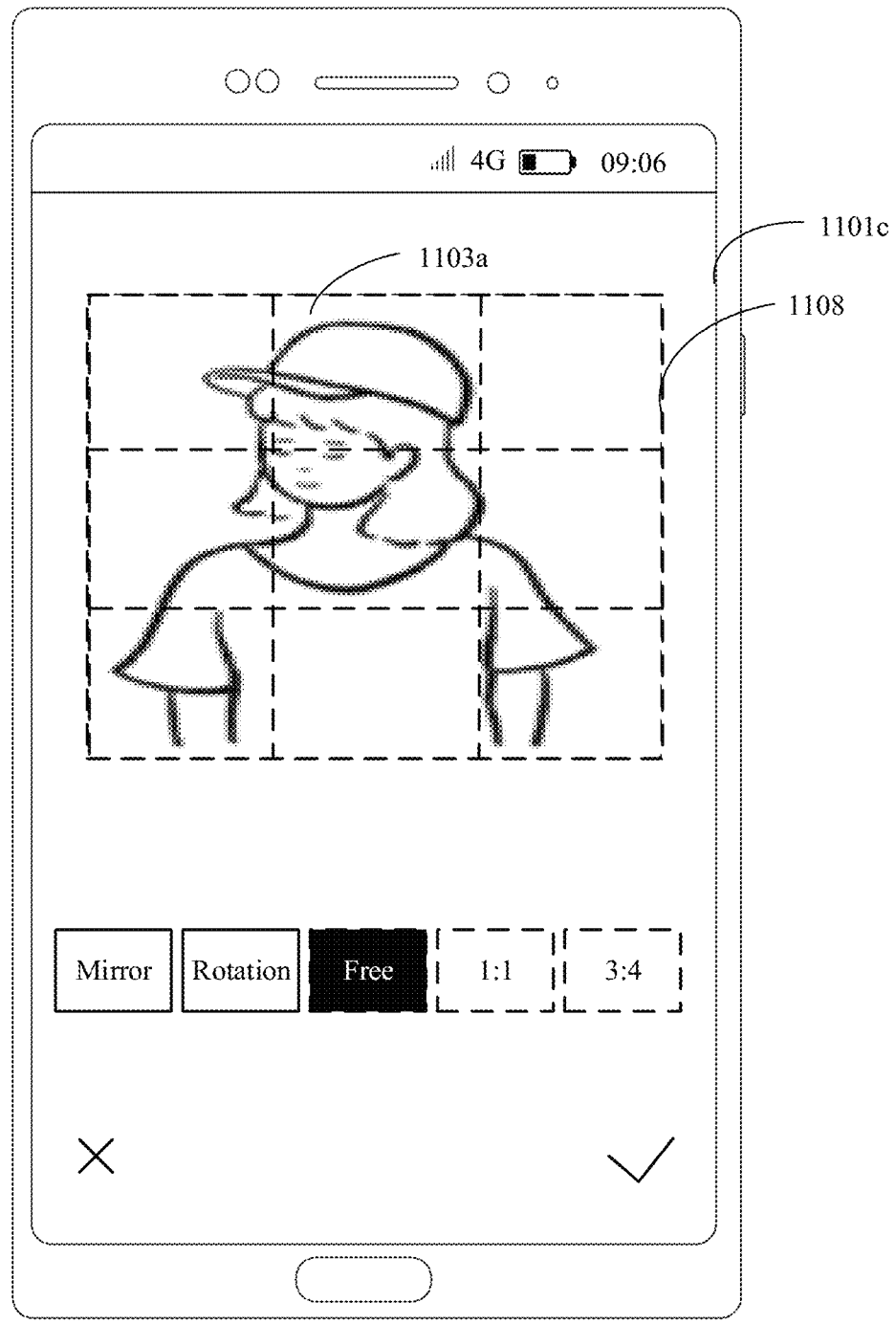
Figure 14E:
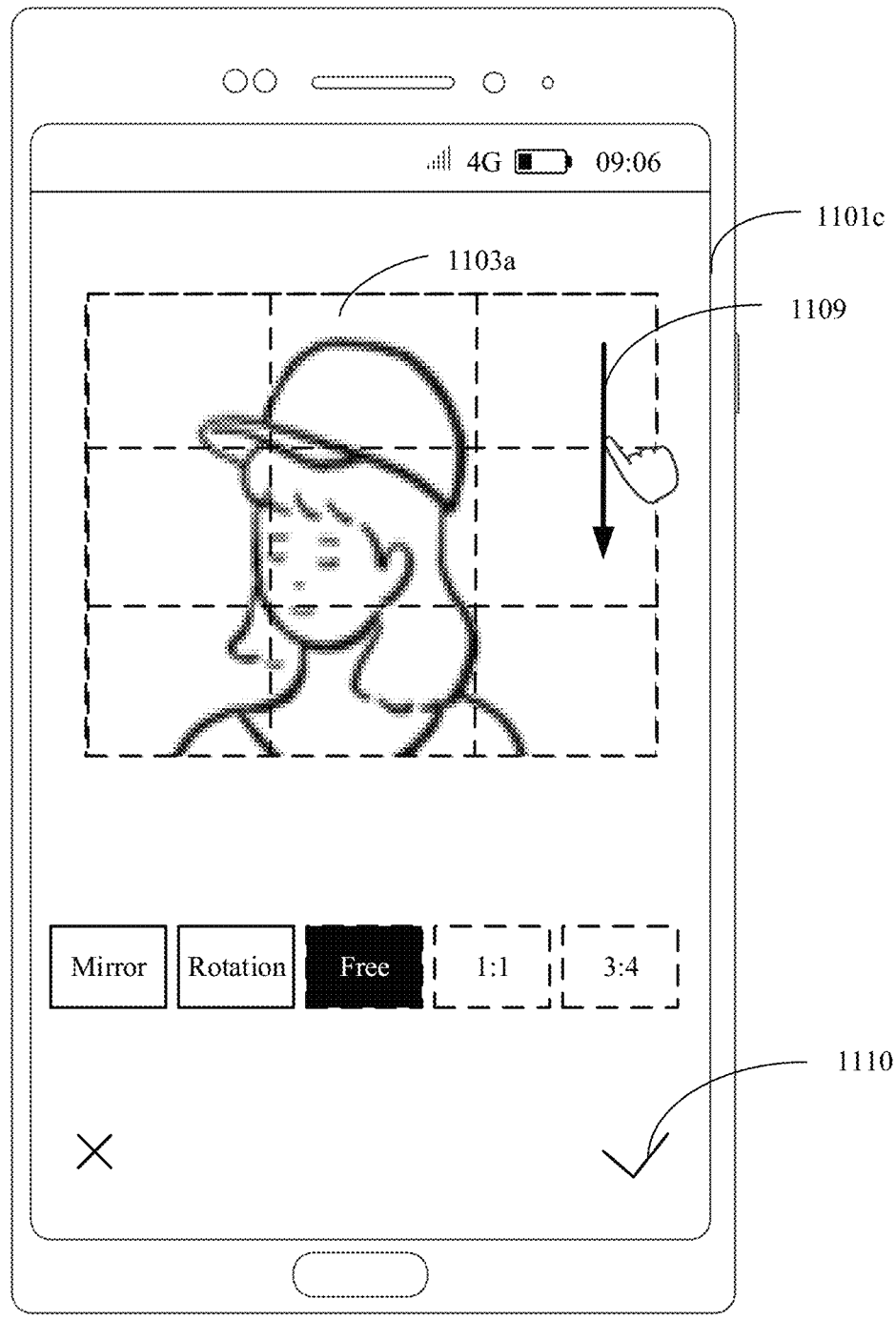
Figure 14F:
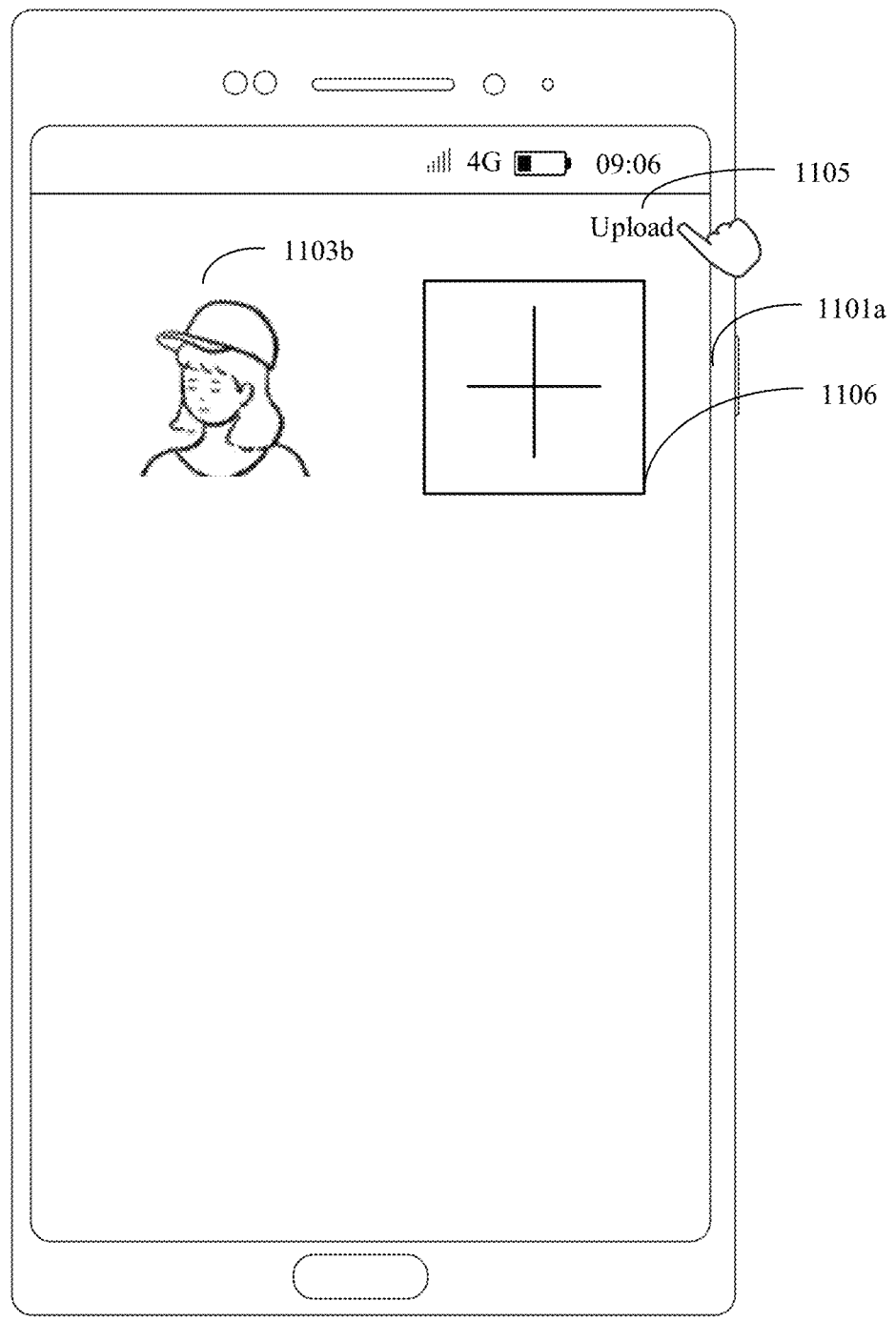
Figure 14A:
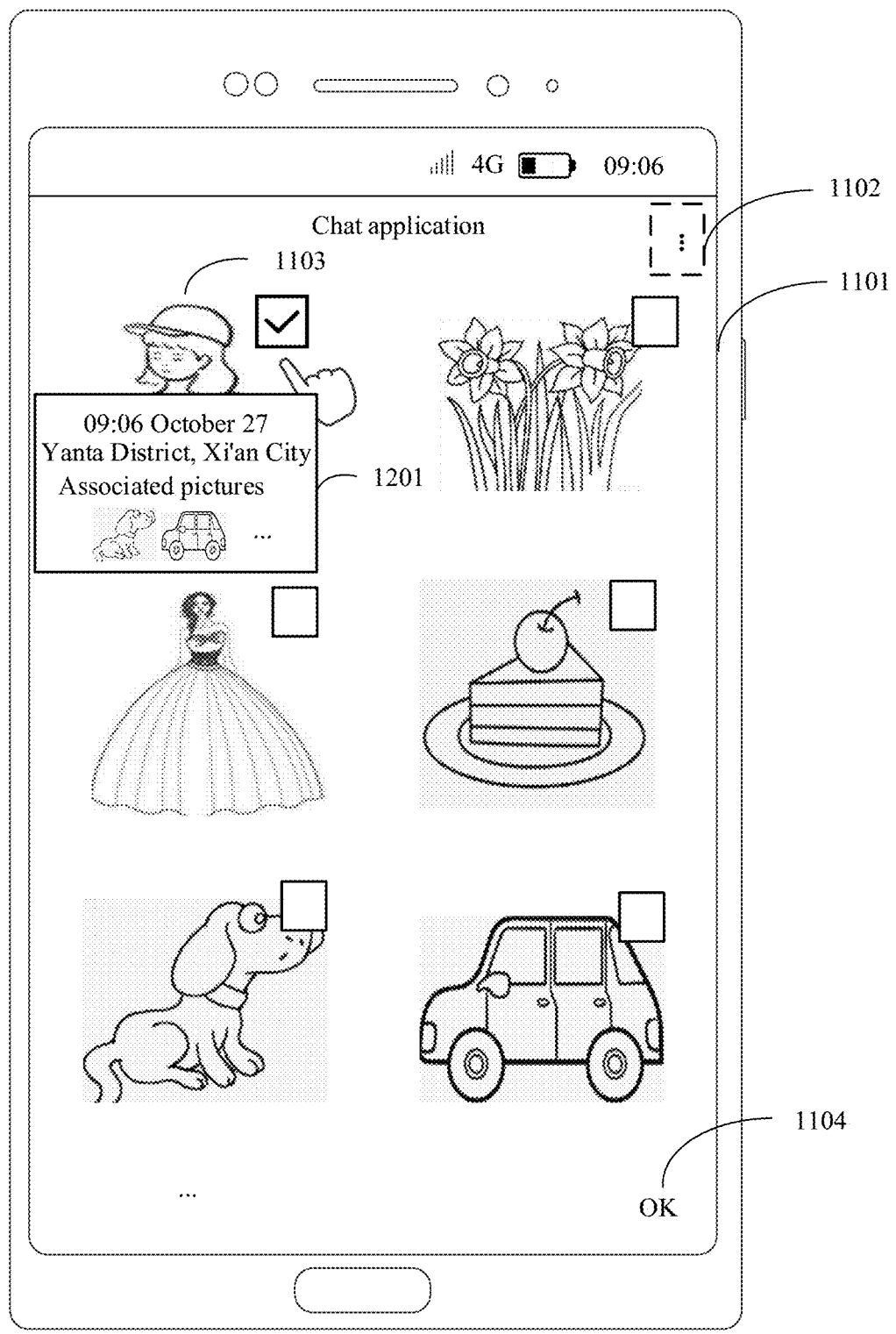

For example, as shown in FIG. 14(a), the user may select the picture 1103 in the interface 1101, and tap a Done button 1104. As shown in FIG. 14(b), the mobile phone may display an interface 1101a in response to the operation in which the user taps the Done button 1104. The interface 1101a includes the to-be-uploaded picture 1103, an Upload button 1105, and a control 1106 used to add more to-be-uploaded pictures. The user may tap or touch and hold the picture 1103 in the interface 1101a. As shown in FIG. 14(c), the mobile phone may display an interface 1101b in response to the operation in which the user taps or touches and holds the picture 1103. The interface 1101b may display an original picture corresponding to the picture 1103 (thumbnail), namely, a picture 1103a, and may further include some operation options including crop, graffiti, filter, sticker, text, and the like. If the user selects a Crop option 1107, in response to the operation in which the user taps the Crop option 1107, as shown in FIG. 14(d), the mobile phone may display an interface 1101c, and the user may crop the picture 1103a in the interface 1101c. The interface 1101c may further include a control (for example, "free", "1:1", and "3:4", a width-to-height ratio of the picture is free by default, that is, the picture 1103a is displayed in a dashed-line box 1108 based on the width-to-height ratio of the original picture) used to adjust the width-to-height ratio of the picture, a Mirror control and Rotation control that are used to edit the picture. As shown in FIG. 14(e), the user may crop the picture 1103a along a track 1109, and then the user may tap a control 1110 to determine that cropping is completed. In response to the operation in which the user taps the control 1110, as shown in FIG. 14(f), the mobile phone may return to the interface 1101a, and display, in the interface 1101a, a thumbnail 1103b of a cropped picture. The user may tap the Upload button 1105 to upload the picture 1103b.

Optionally, the mobile phone may receive an operation performed by the user to arrange the at least one picture, and display an arrangement result of the at least one picture in response to the arrangement operation.

Figure 15B:
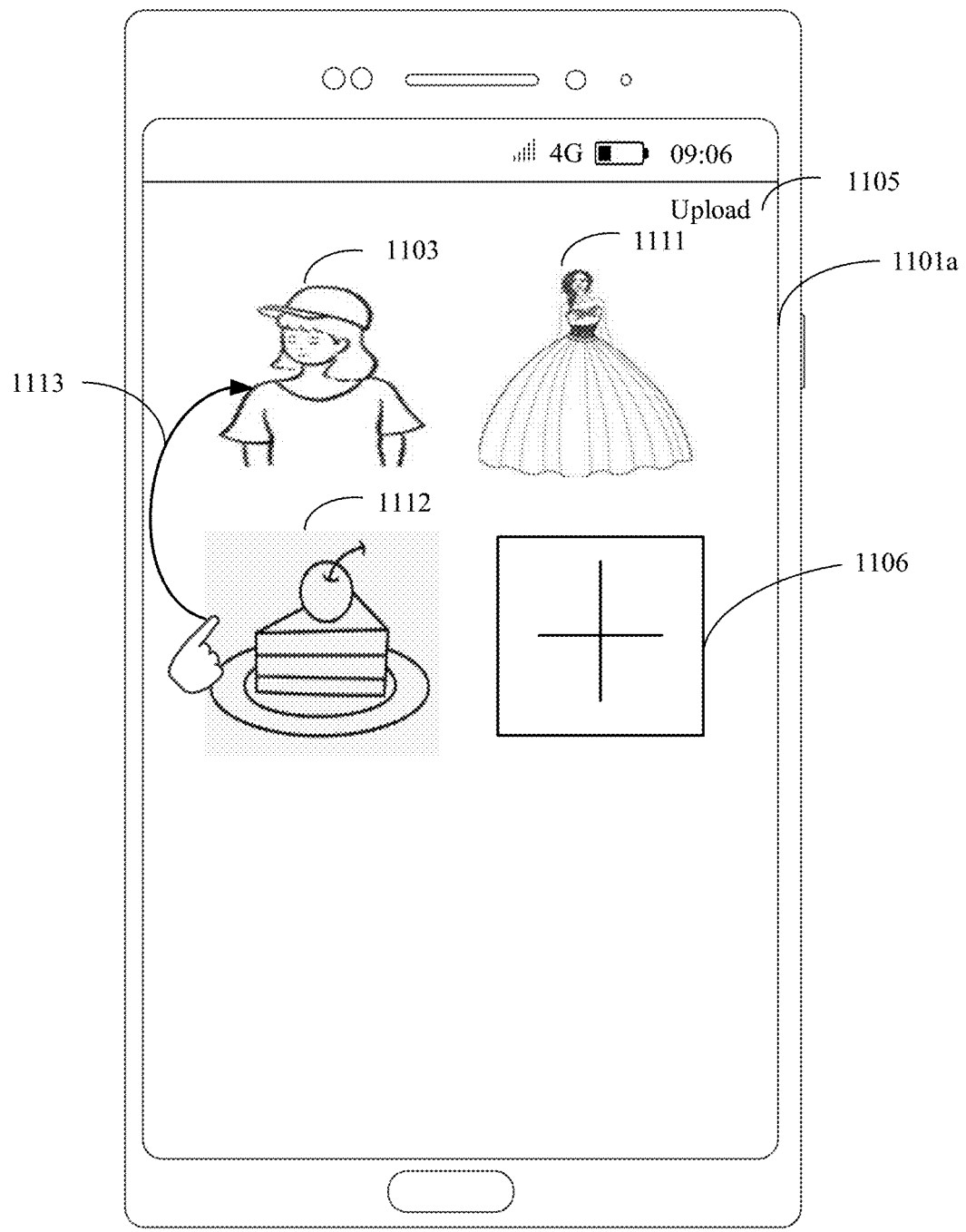
Figure 15C:
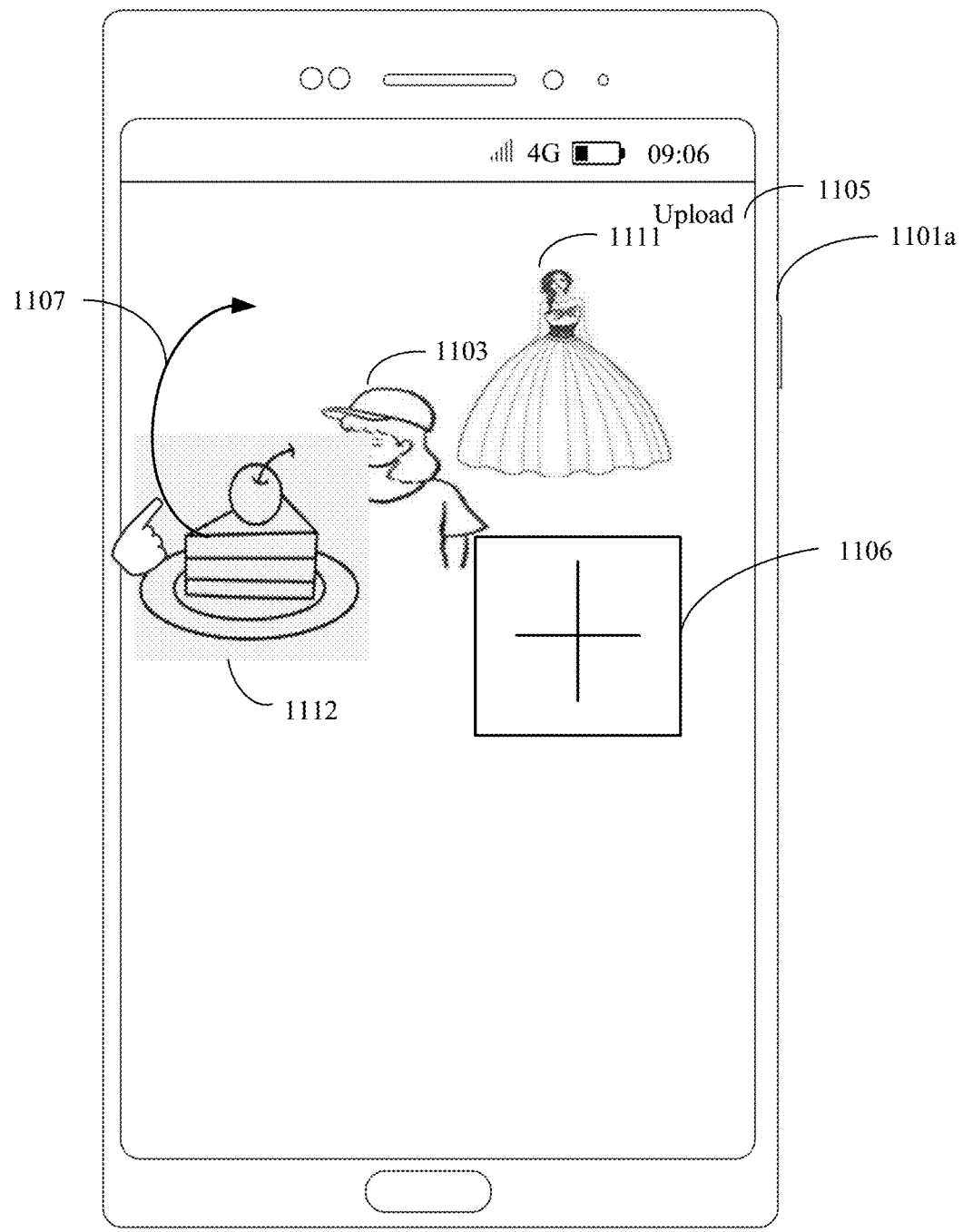
Figure 15D:
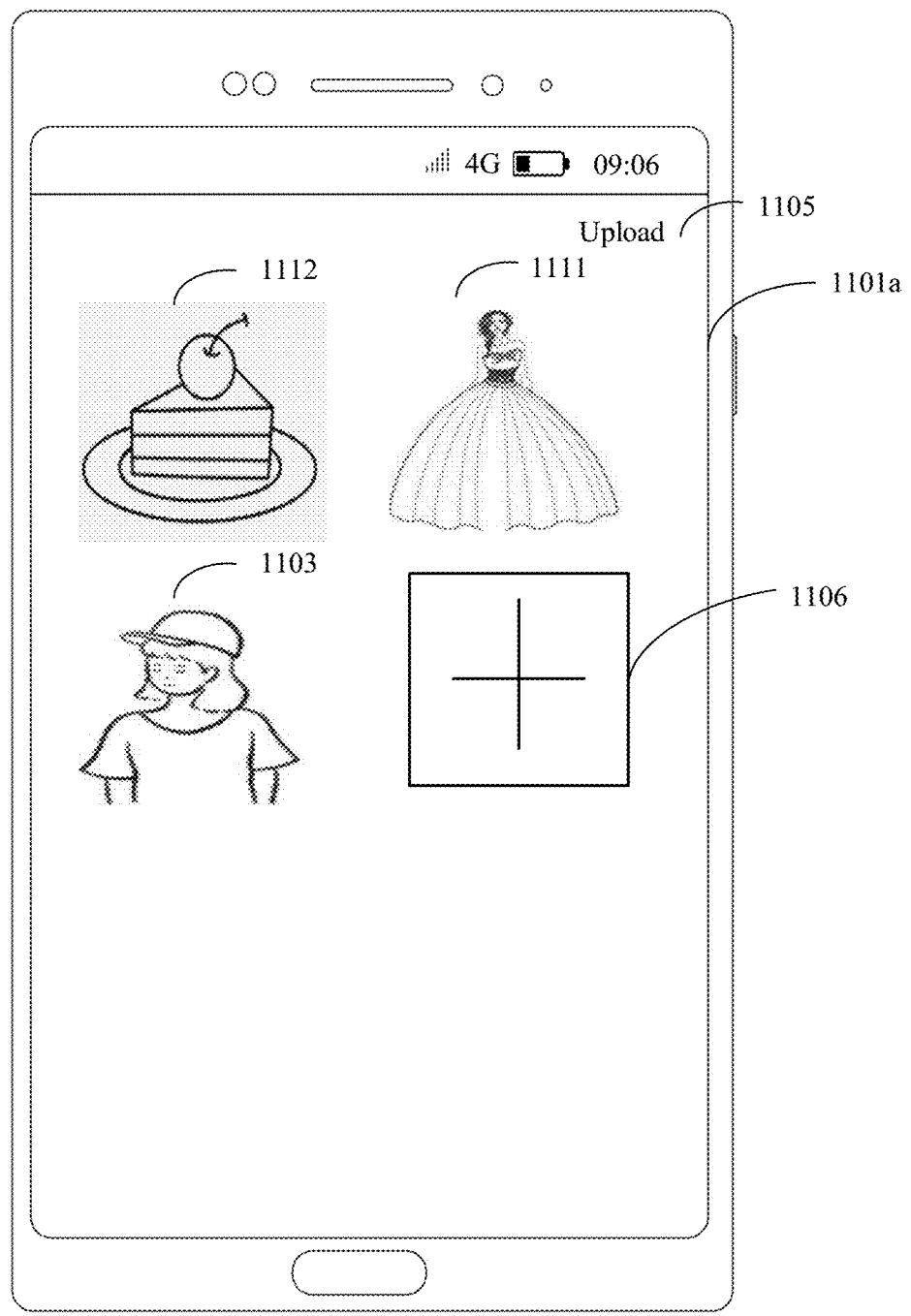

For example, as shown in FIG. 15(a), if the user selects the plurality of pictures in the interface 1101, which are the picture 1103, the picture 1111, and the picture 1112, and taps the Done button 1104, as shown in FIG. 15(b), the mobile phone may display an interface 1101a in response to the operation in which the user taps the Done button 1104. The interface 1101a includes the to-be-uploaded picture 1103, the to-be-uploaded picture 1111, and the to-be-uploaded picture 1112, the Upload button 1105 and a control 1106 used to add more to-be-uploaded pictures. As shown in FIG. 15(b) and FIG. 15(c), the user may drag the picture 1112 along a track 1113. After the drag operation performed by the user ends (for example, after the user releases a finger), as shown in FIG. 15(d), a location of the picture 1103 is exchanged with a location of the picture 1112, that is, a sequence of the picture 1103 and the picture 1112 is changed.

Optionally, the method may further include step 204.

204: Upload the at least one picture selected by the user to a server.

The mobile phone may obtain, based on a path of the at least one picture (the to-be-uploaded picture) selected by the user, the to-be-uploaded picture stored in a disk, import the to-be-uploaded picture into a memory, and upload the picture imported into the memory to the server corresponding to the current application (for example, a wealth management app). Then, the to-be-uploaded picture stored in the memory may be deleted, to save memory space.

Figure 16:
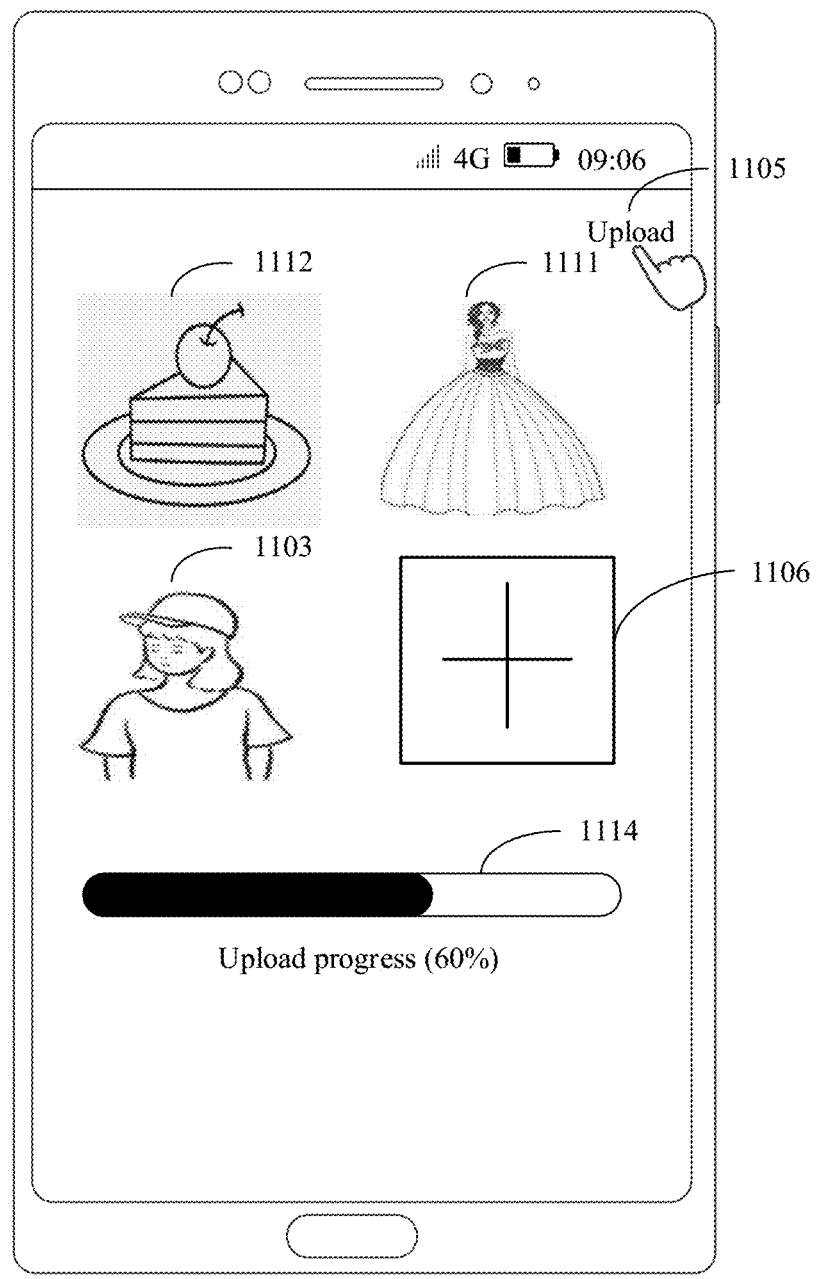
FIG. 16 is a schematic diagram of displaying even still further content on an electronic device according to an embodiment of this application.

Optionally, in a process of uploading the at least one picture, the mobile phone may display an upload progress prompt. As shown in FIG. 16, if the user selects to upload the picture 1103, the picture 1111, and the picture 1112, in response to the operation in which the user taps the Upload button 1105, the mobile phone uploads the three pictures to the server corresponding to the current application (for example, the wealth management app), and may display upload progress of the pictures by using a progress bar 1114.

If the picture is successfully uploaded, the electronic device may display a first prompt that the picture is successfully uploaded; or if the picture fails to be uploaded, the electronic device displays a second prompt that the picture fails to be uploaded. The second prompt includes one or more of the following: a picture format is not supported, a picture size exceeds a first threshold, or a quantity of to-be-uploaded pictures exceeds a second threshold. In this way, the user can learn of, based on the prompt information, a reason why the picture fails to be uploaded, thereby pertinently resolving a problem that the picture fails to be uploaded.

Figure 16A:
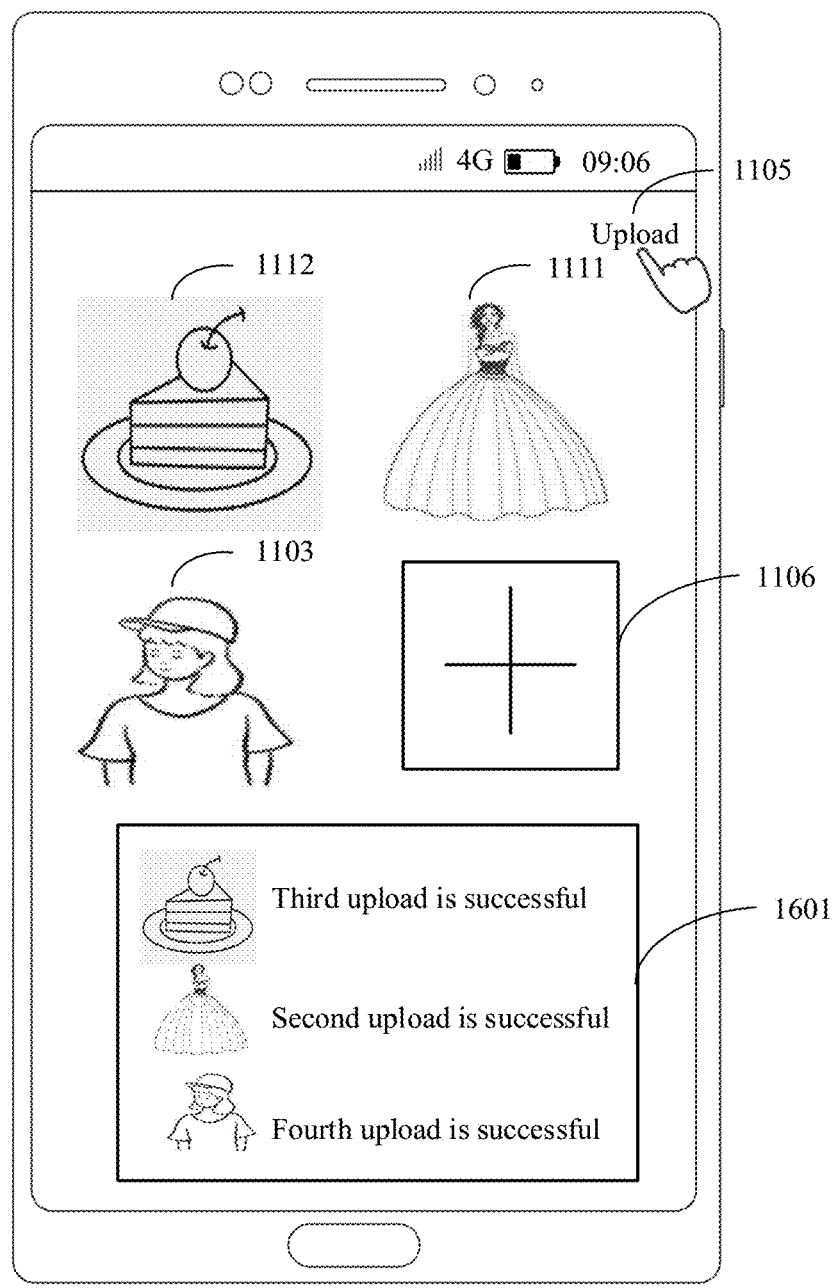
FIG. 16A is a schematic diagram of displaying yet even still other content on an electronic device according to an embodiment of this application.

After the picture is successfully uploaded, the mobile phone may update identifier information of the successfully uploaded picture, and prompt the user with updated identifier information by using the first prompt. In this way, the user can learn of a usage status of the picture based on the updated identifier information of the picture, so that rich reference information about the picture is provided for the user, which helps the user select the required picture more conveniently in the future. For example, the mobile phone may prompt that the picture is successfully uploaded for an $n^{th}$ time, where n may indicate a quantity of times that the picture is successfully uploaded to the current application, or n may indicate a quantity of times that the picture is successfully uploaded to all applications. As shown in FIG. 16A, the mobile phone may separately display, by using a prompt box 1601, quantities of times of successfully uploading a plurality of successfully uploaded pictures. The user may determine that the picture 1112 is successfully uploaded for the third time, the picture 1111 is successfully uploaded for the second time, and the picture 1103 is successfully uploaded for the fourth time. Alternatively, the mobile phone may prompt the user that the picture is successfully uploaded to X applications. The mobile phone may further display a specific application name. For example, the mobile phone may prompt the user that the picture has been successfully uploaded to the X applications such as a chat application, a blog application, and a wealth management application. Alternatively, the mobile phone may display a message indicating that the picture is successfully uploaded at YYYY-MM-DD HH-MM. X and n each are a positive integer greater than or equal to 1.

Further, after the picture is processed in the interaction scenario, for example, after the picture is successfully uploaded in a picture uploading scenario, or after the picture is edited in an editing scenario, the mobile phone may redetermine, based on the updated identifier information, a display manner of the thumbnails of the at least two pictures or the at least two picture sets in the target album interface. In this way, the user may learn of a recent usage status of the picture based on the re-determined display manner, which helps the user select the required picture more conveniently. For example, the mobile phone may re-arrange and display the pictures or the picture set based on a quantity of uploading times or a quantity of editing times of the pictures after the pictures are updated, and the mobile phone may further prompt a use frequency (for example, a quantity of uploading times or a quantity of editing times) of the pictures by using a text, a symbol, an animation, or the like. The mobile phone may further superimpose different identifier information to prompt the usage status of the picture (for example, identifier information such as a quantity of uploading times and a quantity of editing times, and an application name are both included, for example, the picture is uploaded twice in a chat application and is edited for three times in a picture retouching application). Alternatively, the mobile phone may change the identifier information based on the usage status of the picture, for example, replace identifier information generated in a relatively long interaction scenario with identifier information generated in a recent interaction scenario.

According to the method provided in this embodiment of this application, in the interaction scenario of the first application, when the user selects the picture in the target album interface, because the target album interface includes the thumbnails of the at least two pictures that carry different identifier information, or the at least two picture sets that carry different identifier information, and the identifier information is generated based on the interaction scenarios of the at least two applications, the user can select the picture across applications, not limited to select the picture in a historical record in the current application, and does not need to select the picture from massive pictures in the system album, so that the user can select the picture more quickly and pertinently, thereby reducing time for the user to select the picture and improving user experience.

Figure 17:
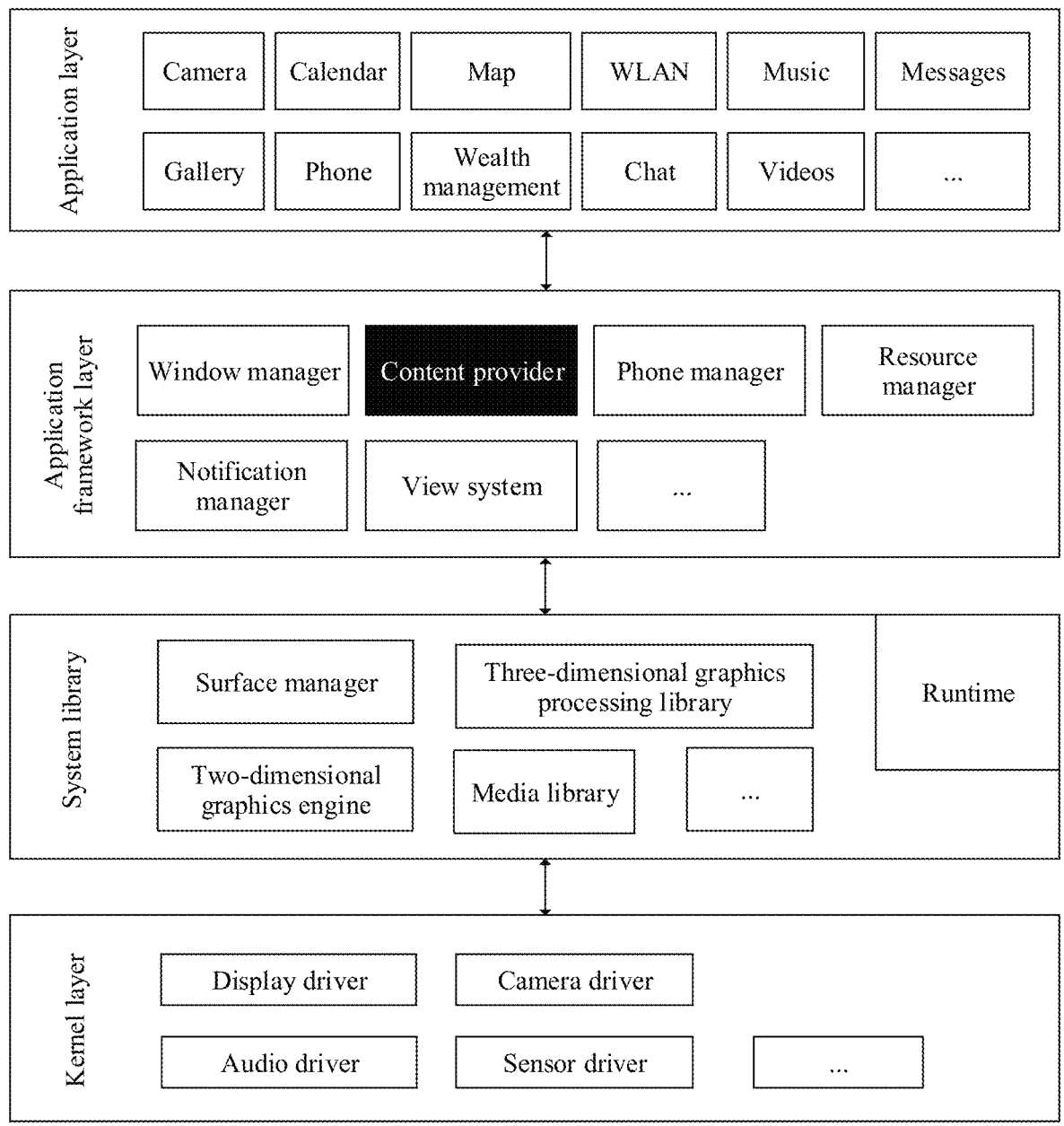
FIG. 17 is a schematic diagram of displaying yet even still further content on an electronic device according to an embodiment of this application.

FIG. 17 is a block diagram of a software structure of an electronic device 100 according to an embodiment of the present disclosure. A software system of the electronic device 100 may use a layered architecture, an event-driven architecture, a microkernel architecture, a micro service architecture, or a cloud architecture. In this embodiment of the present disclosure, an Android system of a layered architecture is used as an example to illustrate the software structure of the electronic device 100.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 17, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 17, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include a video, an image, audio, calls that are made and received, a browsing history and a bookmark, a phone book, and the like.

In this embodiment of this application, the content provider may invoke a multimedia database (MediaStore) to obtain information about a picture in a target album, so as to display a target album interface based on the information about the picture in the target album. A picture in the target album may include a picture that is read from the multimedia database and/or written into the multimedia database in a process of performing an operation such as picture uploading, editing, or downloading by each of at least two applications installed on a mobile phone. For example, a MediaStore.Images.Media.HISITORY_EXTERNAL_CONTENT_URI method may be extended in MediaStore.Images. Media (a class used to define picture information) in MediaStore. The method may define the information about the picture in the target album, which is equivalent to extending a sub-database used to manage the target album in MediaStore. The target album corresponds to a URI. Through transferring the URI corresponding to the target album to MediaStore, the information about the picture in the target album may be queried from MediaStore.

It should be noted that, when a user selects a picture in an application, if the user selects the picture from a system album, a current activity (an activity corresponding to a picture selection interface of the current application) may provide, for the target album by using an XML configuration file corresponding to the current activity, permission for obtaining picture information, and the user chooses whether to enable the permission. If the user chooses to enable the permission, a dedicated data transfer function may be compiled in the system album of the mobile phone to transfer information such as a URI corresponding to the picture selected by the user to MediaStore, so as to update the information about the picture in the target album.

The view system includes visual controls, such as a control for displaying a text and a control for displaying a picture. The view system may be configured to construct an application. A display interface may include one or more views. For example, a display interface including a message notification icon may include a text display view and an image display view.

The phone manager is configured to provide a communications function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification type message, where the displayed notification information may automatically disappear after a short pause and require no user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a work procedure of software of the electronic device 100 with reference to a picture uploading scenario.

Figure 4A:
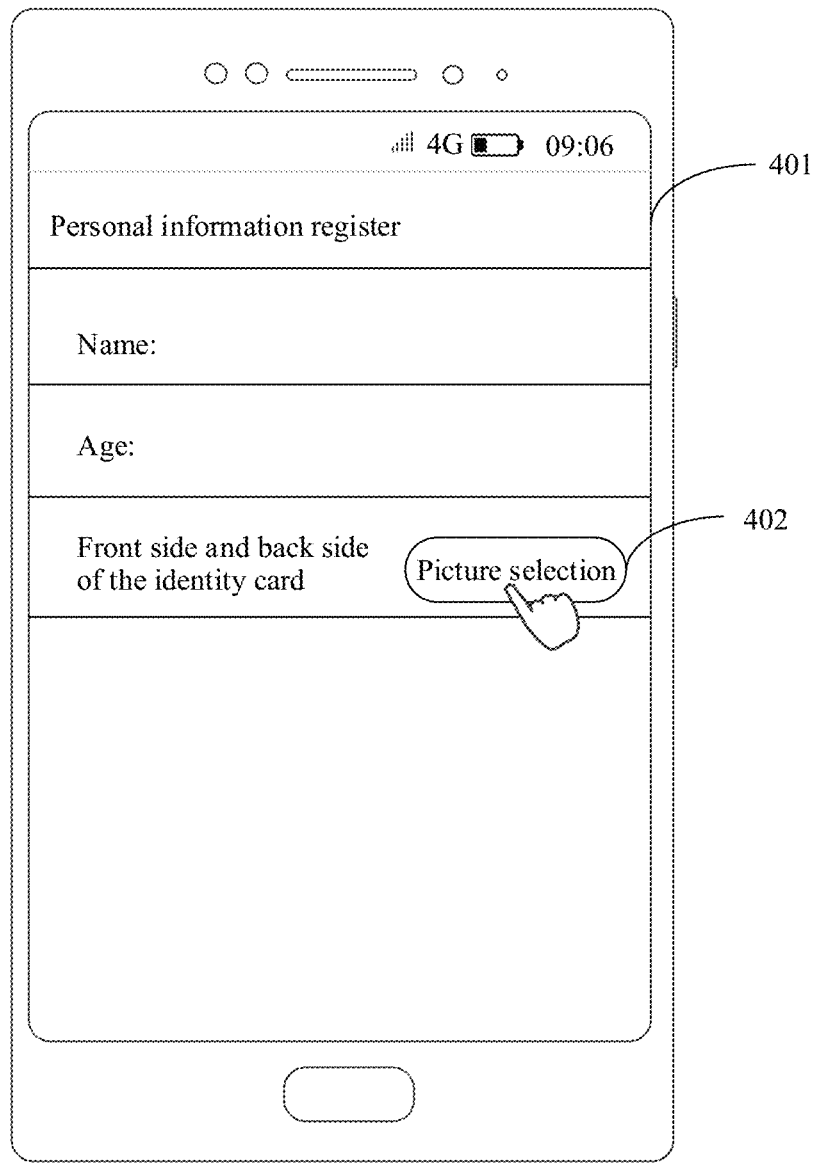
FIG. 4(a) and FIG. 4(b) are a schematic diagram of displaying other content on an electronic device according to an embodiment of this application.
Figure 4B:
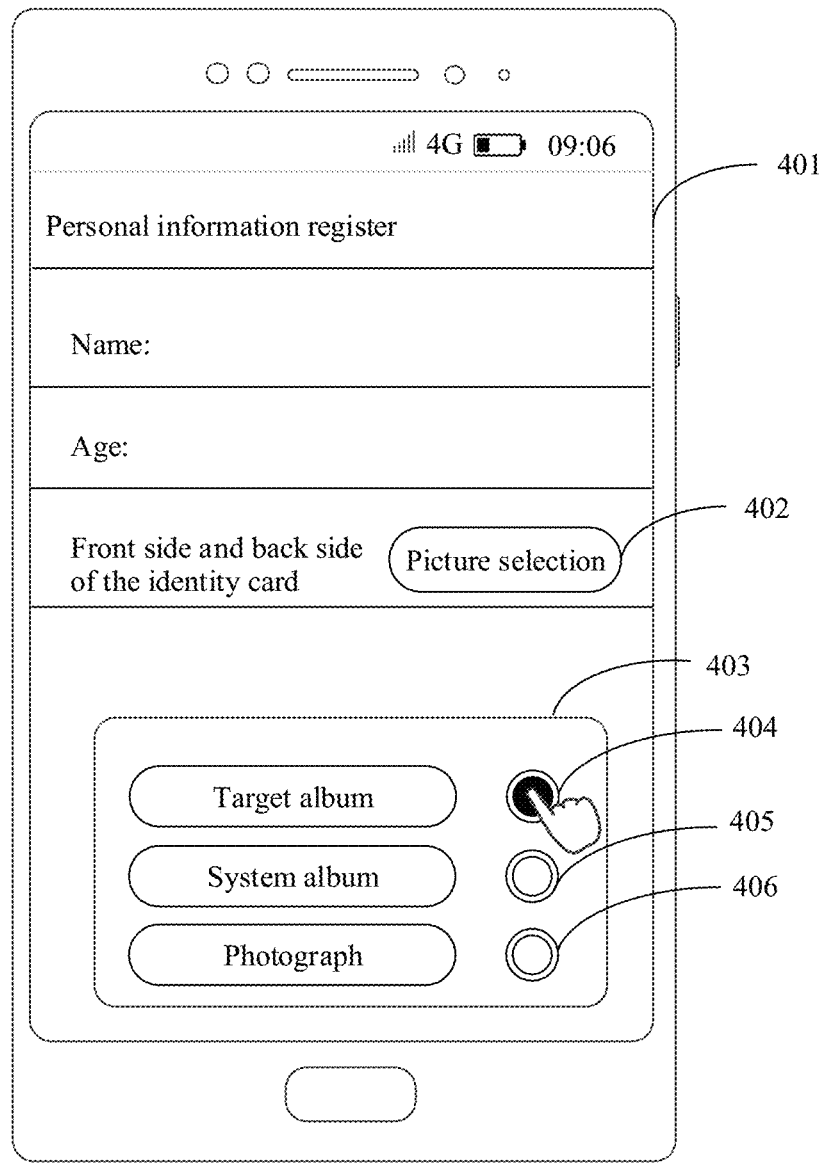

For example, as shown in FIG. 4(a), when a user taps a picture selection button 402, a dialog box 403 may pop up in an interface 401. If the user taps a target album button 404, an activity corresponding to the interface 401 may obtain information about a picture in the target album by using an intent in response to the operation (a second operation) in which the user selects the target album button 404. For example, the activity corresponding to the current interface (the interface 401) may invoke ContentProvider at a framework layer by using an intent, and query a multimedia database (MediaStore) in a system database by using ContentProvider. By transferring a URI (for example, MediaStore.Images.Media.HISITORY_EXTERNAL_CONTENT_URI) corresponding to a target album to MediaStore, a path and identifier information of a picture uploaded by each application may be queried from MediaStore, and then the picture is loaded to a memory according to the path of the picture uploaded by each application. Finally, the picture in the memory is displayed based on the identifier information, for example, display the picture in the memory by using a Gridview control.

The intent may include at least one of the following parameters: the URI corresponding to the target album, a package name of the current application (for example, a wealth management application), a permission parameter for authorizing the current application to use the target album, and a parameter used to request upload time, a quantity of upload times, a content category, and a geographical location of the picture in the target album. If the user does not find the required picture in the target album interface, as shown in FIG. 4(b), the user may tap a system album button 405, to select the picture in a system album interface. The activity corresponding to the current interface (the interface 401) may transfer a URI (for example, MediaStore. Images. Media. EXTERNAL_CONTENT_URI) corresponding to a system album to MediaStore, so that the user can select the picture in the system album interface. The current activity may further transfer information such as a URI (for example, URI=content://media/external/images/media/1393) of the selected picture and the current application to a sub-database of the MediaStore for managing the target album, so as to update (add) the information about the picture in the target album.

In addition, when the user opens a web page (the web page is usually of a Webview control type) in an application and uploads the picture in the web page, a Webview control may provide a callback method for the current application. The current application may return the URI of the picture selected by the user to the Webview control, so that the picture selected by the user can be uploaded to the web page.

Some other embodiments of this application further provide a picture selection apparatus. The apparatus may be applied to the foregoing electronic device. The apparatus is configured to perform functions or steps performed by the mobile phone in the foregoing method embodiment.

Figure 18:
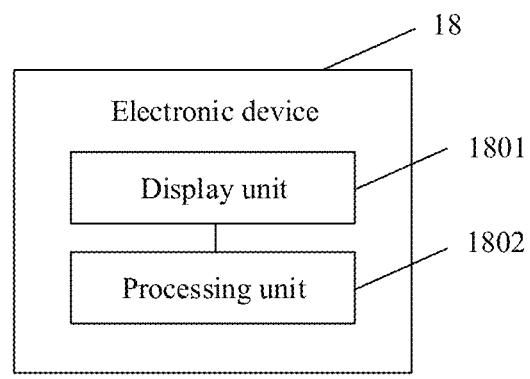
FIG. 18 is a schematic diagram of a structure of another electronic device according to an embodiment of this application.

When each function module is obtained through division corresponding to each function, FIG. 18 is a schematic diagram of a possible structure of the electronic device 18 in the foregoing embodiments. The electronic device is configured to implement the methods described in the foregoing method embodiment, for example, includes a display unit 1801 and a processing unit 1802.

The display unit 1801 is configured to support the electronic device in performing the processes 201 and 202 shown in FIG. 2. The processing unit 1802 is configured to support the electronic device in performing the processes 203 and 204 shown in FIG. 2. All related content of the steps in the foregoing method embodiment may be quoted to function descriptions of the corresponding function modules. Details are not described herein again.

Figure 19:
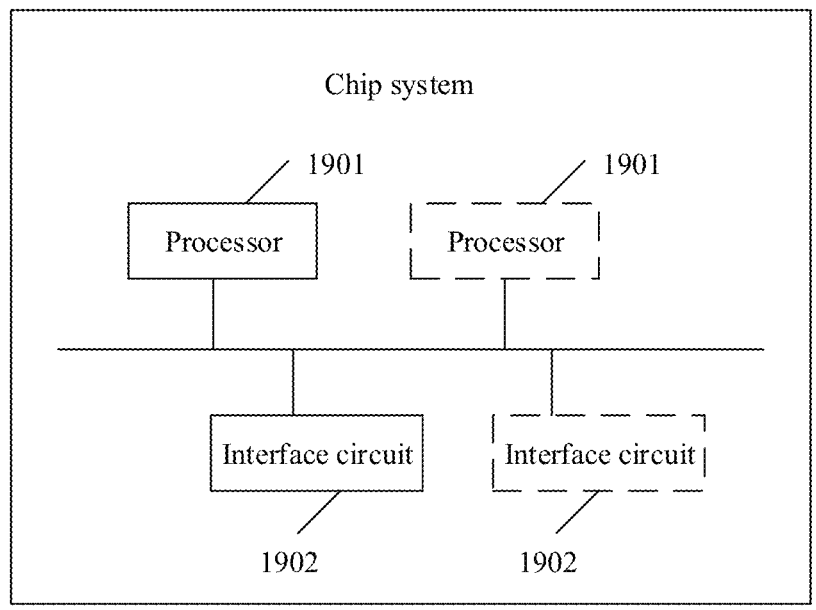
FIG. 19 is a schematic diagram of a structure of a chip system according to an embodiment of this application.

An embodiment of this application further provides a chip system. As shown in FIG. 19, the chip system includes at least one processor 1901 and at least one interface circuit 1902. The processor 1901 and the interface circuit 1902 may be interconnected through a line. For example, the interface circuit 1902 may be configured to receive a signal from another apparatus (for example, a memory of an electronic device). For another example, the interface circuit 1902 may be configured to send a signal to another apparatus (for example, the processor 1901). For example, the interface circuit 1902 may read instructions stored in the memory, and send the instructions to the processor 1901. When the instructions are executed by the processor 1901, the electronic device is enabled to perform the steps in the foregoing embodiments. Certainly, the chip system may further include another discrete component. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or the steps performed by the mobile phone in the foregoing method embodiment.

An embodiment of this application further provides a computer program product. When the computer program product runs on a computer, the computer is enabled to perform the functions or steps performed by the mobile phone in the foregoing method embodiment.

The foregoing descriptions about implementations allow a person skilled in the art to clearly understand that, for the purpose of convenient and brief description, division of the foregoing function modules is used as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected according to actual requirements to achieve the solutions in the embodiment.

In addition, each function unit in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a ROM, a random access memory (RAM), a magnetic disk, or an optical disc.

The foregoing descriptions are merely exemplary implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A picture selection method, applied to an electronic device and comprising:
   displaying, by the electronic device, a first interface in an interaction scenario of a first application, wherein the first interface comprises a picture selection button;
   displaying, by the electronic device, a target album interface in response to a first operation performed by a user to trigger the picture selection button, wherein the target album interface comprises:
   thumbnails of at least two pictures that carry different identifier information; or
   at least two picture sets that carry different identifier information;
   wherein identifier information is generated based on interaction scenarios of at least two applications, and the identifier information comprises at least one of an application name of an application, time of an interaction scenario of an application, or a quantity of times in an interaction scenario of an application;
   displaying, by the electronic device, in response to a third operation in which the user selects at least one picture in the target album interface, at least one of time of the at least one selected picture, a geographical location of the at least one selected picture, and a picture associated with the at least one picture;
   uploading the at least one picture; and
   in response to the at least one picture being successfully uploaded, displaying, by the electronic device, a first prompt that the at least one picture is successfully uploaded, updating, by the electronic device, identifier information of the successfully uploaded picture, and prompting, by the electronic device, the user with the updated identifier information by using the first prompt.

2. The picture selection method according to claim 1, wherein
   the interaction scenario of the application comprises a scenario of picture uploading, picture editing, or picture downloading.

3. The picture selection method according to claim 1, wherein
   the identifier information further comprises at least one of a content category of a picture, a geographical location of a picture, a source of a picture, usage of a picture, favorite information of a picture, or preference information of a picture.

4. The picture selection method according to claim 1, wherein
in the target album interface, a picture or a picture set with identifier information comprising an application name of the first application is located before a picture or a picture set with identifier information comprising an application name of another application.

5. The picture selection method according to claim 1, wherein displaying, by the electronic device, the target album interface in response to the first operation performed by the user to trigger the picture selection button comprises:
popping up, by the electronic device, a dialog box in the first interface in response to the first operation performed by the user to trigger the picture selection button, wherein the dialog box comprises a target album button; and
displaying, by the electronic device, the target album interface in response to a second operation performed by the user to select the target album button.

6. The picture selection method according to claim 1, wherein the method further comprises:
in response to the at least one picture failing to be uploaded, displaying, by the electronic device, a second prompt that the at least one picture fails to be uploaded, wherein
the second prompt comprises one or more of the followings: a picture format is not supported, a picture size exceeds a first threshold, or a quantity of to-be-uploaded pictures exceeds a second threshold.

7. The picture selection method according to claim 1, wherein the method further comprises:
redetermining, by the electronic device, a display manner of the thumbnails of the at least two pictures or the at least two picture sets in the target album interface based on the updated identifier information.

8. The picture selection method according to claim 1, wherein
the at least two applications belong to a same application type;
the at least two applications belong to a group of applications that are jointly developed, jointly registered, jointly packaged, jointly deployed, or mutually bound; or
the at least two applications execute preset logic processing within a preset time period.

9. The picture selection method according to claim 1, wherein displaying, by the electronic device, the target album interface comprises:
controlling, by the electronic device, an activity corresponding to the first interface to start an intent, and transferring, by the electronic device, a uniform resource identifier (URI) of a target album in the intent;
gaining, by the electronic device, an access to a multimedia database based on the URI of the target album, wherein the multimedia database stores paths of the at least two pictures that carry the different identifier information or a path of each picture in the at least two picture sets that carry the different identifier information;
obtaining, by the electronic device, based on the paths of the at least two pictures that carry the different identifier information, the at least two pictures that carry the different identifier information, or obtaining, by the electronic device, based on the path of each picture in the at least two picture sets that carry the different identifier information, each picture in the at least two picture sets that carry the different identifier information; and
performing, by the electronic device, zooming processing on the at least two pictures that carry the different identifier information and displaying, by the electronic device, the at least two pictures that carry the different identifier information, or performing, by the electronic device, zooming processing on cover pictures of the at least two picture sets that carry the different identifier information and displaying, by the electronic device, the cover pictures of the at least two picture sets that carry the different identifier information.

10. The picture selection method according to claim 9, wherein the method further comprises:
in an interaction scenario of each of the at least two applications, writing, by the electronic device, into the multimedia database, a path of a picture on which logic processing that comprises picture uploading, picture editing, or picture downloading is performed.

11. An application display apparatus, applied to an electronic device, wherein the apparatus comprises one or more interface circuits and one or more processors, wherein the one or more interface circuits and the one or more processors are interconnected through a line, wherein the one or more interface circuits are configured to receive computer-executable instructions from the electronic device and send the computer-executable instructions to the one or more processors, when the one or more processors execute the computer-executable instructions, cause the apparatus to perform:
displaying a first interface in an interaction scenario of a first application, wherein the first interface comprises a picture selection button;
displaying a target album interface in response to a first operation performed by a user to trigger the picture selection button, wherein the target album interface comprises:
thumbnails of at least two pictures that carry different identifier information; or
at least two picture sets that carry different identifier information;
wherein identifier information is generated based on interaction scenarios of at least two applications, and the identifier information comprises at least one of an application name of an application, time of an interaction scenario of an application, or a quantity of times in an interaction scenario of an application;
displaying, in response to a third operation in which the user selects at least one picture in the target album interface, at least one of time of the at least one selected picture, a geographical location of the at least one selected picture, and a picture associated with the at least one picture;
uploading the at least one picture; and
in response to the at least one picture being successfully uploaded, displaying a first prompt that the at least one picture is successfully uploaded, updating identifier information of the successfully uploaded picture, and prompting the user with the updated identifier information by using the first prompt.

12. The application display apparatus according to claim 11, wherein the interaction scenario of the application comprises a scenario of picture uploading, picture editing, or picture downloading.

13. The application display apparatus according to claim 11, wherein the identifier information further comprises at least one of a content category of a picture, a geographical location of a picture, a source of a picture, usage of a picture, favorite information of a picture, or preference information of a picture.

14. The application display apparatus according to claim 11, wherein in the target album interface, a picture or a picture set with identifier information comprising an application name of the first application is located before a picture or a picture set with identifier information comprising an application name of another application.

15. A chip system, wherein the chip system is applied to an electronic device, and the chip system comprises one or more interface circuits and one or more processors, wherein the one or more interface circuits and the one or more processors are interconnected through a line, wherein the one or more interface circuits are configured to:
 receive a signal from a memory in the electronic device, and send the signal to the one or more processors, and wherein the signal comprises computer-executable instructions stored in the memory; and when the one or more processors execute the computer-executable instructions, the electronic device performs:
 displaying a first interface in an interaction scenario of a first application, wherein the first interface comprises a picture selection button;
 displaying a target album interface in response to a first operation performed by a user to trigger the picture selection button, wherein the target album interface comprises:
 thumbnails of at least two pictures that carry different identifier information; or
 at least two picture sets that carry different identifier information;
 wherein identifier information is generated based on interaction scenarios of at least two applications, and the identifier information comprises at least one of an application name of an application, time of an interaction scenario of an application, or a quantity of times in an interaction scenario of an application;
 displaying, in response to a third operation in which the user selects at least one picture in the target album interface, at least one of time of the at least one selected picture, a geographical location of the at least one selected picture, and a picture associated with the at least one picture;
 uploading the at least one picture; and
 in response to the at least one picture being successfully uploaded, displaying a first prompt that the at least one picture is successfully uploaded, updating identifier information of the successfully uploaded picture, and prompting the user with the updated identifier information by using the first prompt.

16. The chip system according to claim 15, wherein the interaction scenario of the application comprises a scenario of picture uploading, picture editing, or picture downloading.

17. The chip system according to claim 15, wherein the identifier information further comprises at least one of a content category of a picture, a geographical location of a picture, a source of a picture, usage of a picture, favorite information of a picture, or preference information of a picture.

18. A non-transitory computer-readable storage medium, comprising computer-executable instructions, wherein when the computer-executable instructions are run on an electronic device, the electronic device performs the picture selection method according to claim 1.

* * * * *